(12) United States Patent
Tjader

(10) Patent No.: US 10,975,997 B2
(45) Date of Patent: *Apr. 13, 2021

(54) JOINTED PIPE SPLITTER WITH PNEUMATIC HAMMER

(71) Applicant: TT Technologies, Inc., Aurora, IL (US)

(72) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/563,155

(22) Filed: Sep. 6, 2019

(65) Prior Publication Data
US 2019/0390815 A1 Dec. 26, 2019

Related U.S. Application Data

(63) Continuation of application No. 15/297,768, filed on Oct. 19, 2016, now Pat. No. 10,422,462, which is a
(Continued)

(51) Int. Cl.
F16L 55/00 (2006.01)
F16L 55/165 (2006.01)
F16L 55/18 (2006.01)

(52) U.S. Cl.
CPC .......... F16L 55/1658 (2013.01); F16L 55/18 (2013.01)

(58) Field of Classification Search
CPC ........ F16L 55/1658; F16L 55/18; F16L 1/26; F16L 1/032; F16L 1/028; F16L 1/024;
(Continued)

(56) References Cited

U.S. PATENT DOCUMENTS 1,798,121 A * 3/1931 Jackes ................. F16L 27/0849
285/55
2,896,669 A * 7/1959 Broadway ................. F16L 7/00
138/113
(Continued)

FOREIGN PATENT DOCUMENTS

WO WO-2005008084 A1 1/2005

OTHER PUBLICATIONS

"U.S. Appl. No. 12/898,339, Final Office Action dated Aug. 26, 2013", 21 pgs.
(Continued)

Primary Examiner — Edwin J Toledo-Duran
(74) Attorney, Agent, or Firm — Schwegman Lundberg & Woessner, P.A.

(57) ABSTRACT

A pipe splitting assembly includes an articulating hammer nose assembly having a pipe splitting cutter and a rotatable joint coupled with the pipe splitting cutter. A pneumatic hammer is distal to the articulating hammer nose assembly, The pneumatic hammer is configured to drive the articulating hammer nose assembly proximally away from the pneumatic hammer. The rotatable joint is coupled between the pipe splitting cutter and the pneumatic hammer, and the articulating hammer nose assembly is rotatable into one or more angles relative to the pneumatic hammer through the rotatable joint. A cable coupling is interposed between the pneumatic hammer and the articulated hammer nose assembly. The cable coupling is configured to attach a cable to the pipe splitting assembly. The cable coupling and the rotatable joint are configured to transmit to the pipe splitting cutter a compression force from the cable coupling and dynamic percussive forces from the pneumatic hammer.

9 Claims, 26 Drawing Sheets

Related U.S. Application Data continuation of application No. 14/794,225, filed on Jul. 8, 2015, now Pat. No. 9,476,536, which is a continuation of application No. 12/898,339, filed on Oct. 5, 2010, now Pat. No. 9,103,483.

(60) Provisional application No. 61/248,720, filed on Oct. 5, 2009.

(58) Field of Classification Search
CPC .......... F16L 1/207; E21B 29/00; B23D 21/14; E03F 2003/065; E03F 3/06; B26D 3/001; B26D 7/2614; B23C 5/109; B32B 38/0004
USPC ........ 405/184.3, 156, 184.1, 154.1; 138/114, 138/155, 109; 83/188, 191, 178; 166/55, 166/55.1, 55.2, 55.3, 55.6, 55.7, 55.8
See application file for complete search history.

(56) References Cited

U.S. PATENT DOCUMENTS

| | | | | |
|---|---|---|---|---|
| 3,776,586 | A * | 12/1973 | Ahlgren | F16G 11/106 294/102.1 |
| 4,149,567 | A * | 4/1979 | Weirich | E21D 23/26 138/111 |
| 4,372,584 | A * | 2/1983 | Miller | F16L 37/002 285/18 |
| 4,385,021 | A * | 5/1983 | Neeley | H01B 7/0072 138/111 |
| 4,505,302 | A * | 3/1985 | Streatfield | E21B 7/30 138/97 |
| 4,507,019 | A * | 3/1985 | Thompson | E21B 7/046 138/97 |
| 4,630,676 | A * | 12/1986 | Long, Jr. | E03F 3/06 166/55 |
| 4,648,746 | A * | 3/1987 | Abinett | E21B 4/14 138/97 |
| 4,657,436 | A * | 4/1987 | Yarnell | E03F 3/06 138/97 |
| 4,674,914 | A * | 6/1987 | Wayman | E21B 4/18 138/97 |
| 4,693,404 | A * | 9/1987 | Wayman | E21B 7/30 225/103 |
| 4,738,565 | A * | 4/1988 | Streatfield | E21B 7/30 138/97 |
| 4,787,592 | A * | 11/1988 | Aoshika | E04B 9/20 24/136 R |
| 4,789,268 | A * | 12/1988 | Yarnell | E03F 3/06 166/361 |
| 4,925,344 | A * | 5/1990 | Peres | E21B 7/20 166/55 |
| 5,013,188 | A * | 5/1991 | Campbell | E21B 7/30 405/184 |
| 5,015,023 | A * | 5/1991 | Hall | F16G 11/048 24/115 G |
| 5,044,824 | A * | 9/1991 | Long, Jr. | E03F 3/06 405/156 |
| 5,076,731 | A * | 12/1991 | Luksch | F16L 55/1658 405/184.3 |
| 5,078,546 | A * | 1/1992 | Fisk | F16L 55/1658 405/156 |
| 5,098,225 | A * | 3/1992 | Rockower | B23D 21/02 138/97 |
| 5,112,158 | A * | 5/1992 | McConnell | F16L 55/1658 405/184.3 |
| 5,127,481 | A * | 7/1992 | Hesse | E21B 7/30 175/295 |
| 5,171,106 | A * | 12/1992 | Rockower | B23D 21/02 138/97 |
| 5,192,165 | A * | 3/1993 | Torielli | E21B 7/30 138/111 |
| 5,205,671 | A * | 4/1993 | Handford | E21B 7/30 175/62 |
| 5,302,053 | A * | 4/1994 | Moriarty | F16L 55/1658 166/55.2 |
| 5,306,101 | A * | 4/1994 | Rockower | B23D 21/02 166/55.3 |
| 5,482,404 | A * | 1/1996 | Tenbusch, II | E21B 7/20 405/184 |
| 5,497,807 | A * | 3/1996 | Rogers | F16L 55/1645 138/98 |
| RE35,271 | E * | 6/1996 | Fisk | E21B 29/00 405/184.3 |
| 5,544,977 | A * | 8/1996 | Cravy | E21B 7/30 166/55 |
| 5,575,331 | A * | 11/1996 | Terrell | E21B 23/04 166/212 |
| 5,580,188 | A * | 12/1996 | Nowak | E21B 7/28 405/156 |
| 5,628,585 | A * | 5/1997 | Parish, II | E03F 3/06 175/53 |
| 6,039,505 | A * | 3/2000 | Tenbusch, II | F16L 55/1658 405/156 |
| 6,092,553 | A * | 7/2000 | Hodgson | E21B 7/30 138/97 |
| 6,098,708 | A * | 8/2000 | Jenne | F16L 55/1658 166/55.3 |
| 6,340,270 | B2 * | 1/2002 | Puttmann | E21B 7/30 138/97 |
| 6,357,967 | B1 * | 3/2002 | Putnam | F16L 55/1658 254/29 R |
| 6,382,877 | B1 * | 5/2002 | Hodgson | F16L 55/1658 138/97 |
| 6,443,658 | B1 * | 9/2002 | Lincoln | E21B 7/30 175/53 |
| 6,499,912 | B2 * | 12/2002 | Coon | F16L 55/1658 138/97 |
| 6,588,983 | B1 * | 7/2003 | Tenbusch, II | E21B 7/30 405/184.3 |
| 6,755,593 | B2 * | 6/2004 | Wentworth | F16L 55/1658 405/184.3 |
| 6,761,507 | B2 * | 7/2004 | Wentworth | E21B 4/14 173/200 |
| 6,793,442 | B2 * | 9/2004 | Carter | B23D 21/02 405/184.3 |
| 7,086,808 | B2 * | 8/2006 | Wentworth | E02F 5/10 405/184 |
| 7,255,516 | B2 * | 8/2007 | Wentworth | E21B 4/14 405/184.3 |
| 7,384,214 | B2 * | 6/2008 | Tjader | F16L 55/1658 405/184.3 |
| 7,578,636 | B2 * | 8/2009 | Tjader | B23D 21/02 138/97 |
| 7,824,130 | B2 * | 11/2010 | Koch | E21B 7/205 405/184.3 |
| 8,037,599 | B2 * | 10/2011 | Pichler | H02G 1/08 29/870 |
| 9,103,483 | B2 | 8/2015 | Tjader | |
| 9,476,536 | B2 | 10/2016 | Tjader | |
| 2002/0081155 | A1 * | 6/2002 | Putnam | F16L 55/1658 405/184 |
| 2003/0084764 | A1 * | 5/2003 | Wentworth | F16L 55/1658 83/13 |
| 2003/0165360 | A1 * | 9/2003 | Wentworth | E21B 4/14 405/184.3 |
| 2004/0223812 | A1 * | 11/2004 | Wentworth | E21B 4/14 405/184.3 |
| 2004/0265067 | A1 * | 12/2004 | Putnam | F16L 55/1658 405/184.3 |
| 2006/0088384 | A1 * | 4/2006 | Putnam | F16L 55/18 405/184.1 |
| 2006/0243444 | A1 * | 11/2006 | Brisco | E21B 21/10 166/298 |
| 2007/0036613 | A1 | 2/2007 | Tjader | |
| 2007/0048091 | A1 * | 3/2007 | Tjader | F16L 55/1658 405/184.3 |

(56) References Cited

U.S. PATENT DOCUMENTS

| | | | |
|---|---|---|---|
| 2010/0178113 A1* | 7/2010 | Tjader | F16G 11/048 |
| | | | 405/184.3 |
| 2011/0081206 A1 | 4/2011 | Tjader | |
| 2015/0308604 A1 | 10/2015 | Tjader | |
| 2017/0037993 A1 | 2/2017 | Tjader | |

OTHER PUBLICATIONS

"U.S. Appl. No. 12/898,339, Final Office Action dated Nov. 28, 2014", 22 pgs.

"U.S. Appl. No. 12/898,339, Non Final Office Action dated May 9, 2014", 22 pgs.

"U.S. Appl. No. 12/898,339, Non Final Office Action dated Dec. 31, 2012", 20 pgs.

"U.S. Appl. No. 12/898,339, Notice of Allowance dated Apr. 2, 2015", 15 pgs.

"U.S. Appl. No. 12/898,339, Respons filed Mar. 2, 2015 to Final Office Action dated Nov. 28, 2014", 13 pgs.

"U.S. Appl. No. 12/898,339, Response filed Jan. 27, 2014 to Final Office Action dated Aug. 26, 2013", 17 pgs.

"U.S. Appl. No. 12/898,339, Response filed Apr. 30, 2013 to Non Final Office Action dated Dec. 31, 2012", 21 pgs.

"U.S. Appl. No. 12/898,339, Response filed Aug. 11, 2014 to Non Final Office Action dated May 9, 2014", 14 pgs.

"U.S. Appl. No. 14/794,225 Response filed Jan. 26, 2016 to Non-Final Office Action dated Aug. 31, 2015", 13 pgs.

"U.S. Appl. No. 14/794,225, Final Office Action dated Mar. 7, 2016", 12 pgs.

"U.S. Appl. No. 14/794,225, Notice of Allowance dated Jun. 28, 2016", 13 pgs.

"U.S. Appl. No. 14/794,225, Response filed Jun. 7, 2016 to Final Office Action dated Mar. 7, 2016", 12 pgs.

"U.S. Appl. No. 15/297,768, Advisory Action dated Mar. 8, 2018" 3 pgs.

"U.S. Appl. No. 15/297,768, Final Office Action dated Jan. 11, 2019", 5 pgs.

"U.S. Appl. No. 15/297,768, Final Office Action dated Dec. 13, 2017", 11 pgs.

"U.S. Appl. No. 15/297,768, Non Final Office Action dated Jun. 1, 2018", 15 pgs.

"U.S. Appl. No. 15/297,768, Non Final Office Action dated Jun. 16, 2017", 12 pgs.

"U.S. Appl. No. 15/297,768, Non Final Office Action dated Dec. 8, 2016", 7 pgs.

"U.S. Appl. No. 15/297,768, Notice of Allowance dated May 22, 2019", 10 pgs.

"U.S. Appl. No. 15/297,768, Preliminary Amendment filed Nov. 14, 2016", 5 pgs.

"U.S. Appl. No. 15/297,768, Response filed Feb. 13, 2018 to Final Office Action dated Dec. 13, 2017", 9 pgs.

"U.S. Appl. No. 15/297,768, Response filed Mar. 8, 2017 to Non Final Office Action dated Dec. 8, 2016", 6 pgs.

"U.S. Appl. No. 15/297,768, Response filed Sep. 4, 2018 to Non Final Office Action dated Jun. 1, 2018", 10 pgs.

"U.S. Appl. No. 15/297,768, Response filed Apr. 11, 2019 to FInal Office Action dated Jan. 11, 2019", 6 pgs.

"U.S. Appl. No. 15/297,768, Response filed Sep. 18, 2017 to Non-Final Office Action dated Jun. 16, 2017", 9 pgs.

1 "U.S. Appl. No. 14/794,225, Non-Final Office Action dated Aug. 31, 2015", 15 pgs.

U.S. Appl. No. 12/898,339 U.S. Pat. No. 9,103,483, filed Oct. 5, 2010, Jointed Pipe Splitter With Pneumatic Hammer.

U.S. Appl. No. 14/794,225 U.S. Pat. No. 9,476,536, filed Jul. 8, 2015, Jointed Pipe Splitter With Pneumati Hammer.

U.S. Appl. No. 15/297,768 U.S. Pat. No. 10,422,462, filed Oct. 19, 2016, Jointed Pipe Splitter With Pneumatic Hammer.

\* cited by examiner

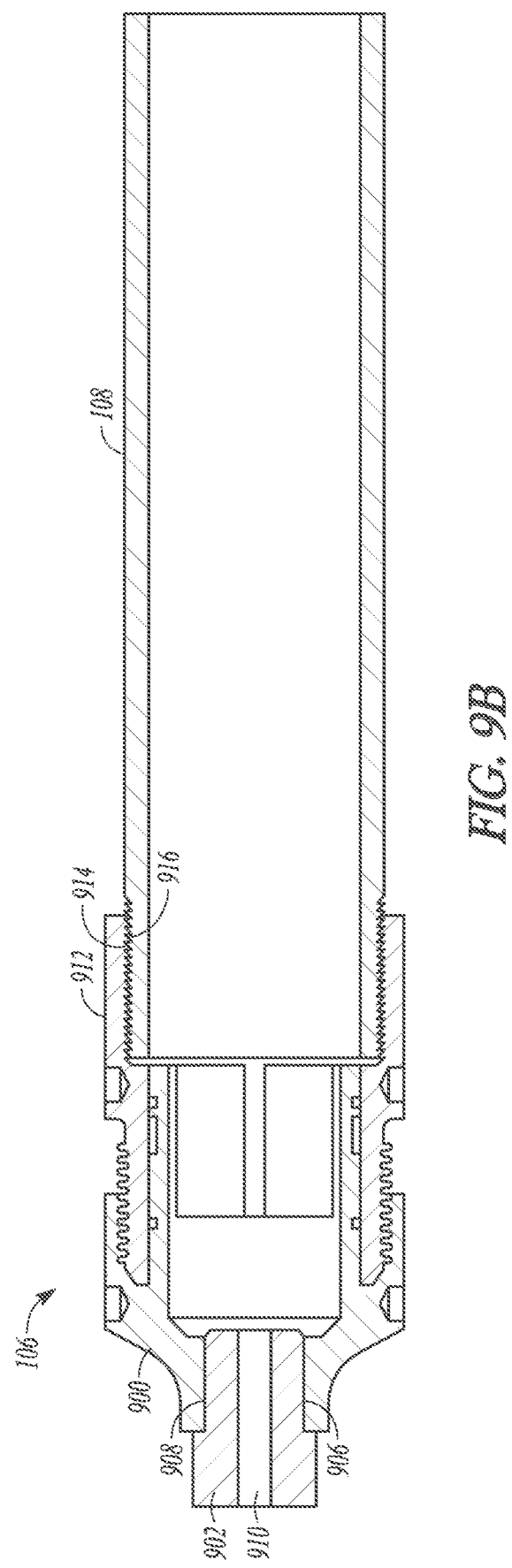

JOINTED PIPE SPLITTER WITH PNEUMATIC HAMMER

RELATED APPLICATIONS

This patent application is a Continuation of U.S. patent application Ser. No. 15/297,768, filed Oct. 19, 2016, whish is a Continuation of U.S. patent application Ser. No. 14/794,225, filed Jul. 8, 2015, which is a Continuation of U.S. patent application Ser. No. 12/898,339, filed Oct. 5, 2010, which claims the benefit of priority, under 35 U.S.C. § 119(e), to U.S. Provisional Patent Application Ser. No. 61/248,720, filed on Oct. 5, 2009, which applications are incorporated herein by reference in their entirety.

TECHNICAL FIELD

Linear and non-linear pipe splitting

BACKGROUND

Pipe, such as plastic, copper, lead pipe and the like, has been used for connecting homes and creating networks for utilities, for instance, water, sewage and natural gas. As pipes become older, they break down, crack, develop scaling on interior surfaces that can clog the pipe, and the like and thereby require replacement.

A technique known as pipe bursting is currently used as a convenient method to replace underground pipe without the need to completely excavate the pipe needing replacement. A pipe breaking device, such as an expander or a mole, is pulled by a 25 cable through the existing pipe while it is still underground. The expander is designed to break, split or burst the pipe, and at the same time push the old pipe into the surrounding soil. The expansion of the old pipe allows the expander to pull a replacement pipe into place.

In one example, pipe splitters are used to burst piping and thereby must navigate tight bends in the pipe. An elongate pipe splitter experiences stress as it attempts to navigate tight bends and sometimes fractures within the pipe. This requires extraction and replacement of the pipe splitter to continue the operation. Replacement of the pipe splitter increases labor. Additionally, the pipe splitter is constructed with hardened steel in some examples, and is expensive. Replacing the pipe splitter thereby increases the cost of splitting small diameter pipes.

In other examples, percussive devices including pneumatic reciprocating hammers are coupled with pipe splitters to more easily split apart piping. Pneumatic hammers drive the pipe splitter through the piping as the pipe splitter is pulled through the existing piping by an attached cable. Where the existing piping includes non-linear portions (bends, curves and the like) the pneumatic hammer may force the pipe splitter to wander by driving the pipe splitter entirely out of the existing pipe and into the surrounding soil. Additionally, some piping and tubing is rolled out from a spool and includes natural non-linear portions including bends. The percussive forces from the pneumatic hammers can drive the pipe splitters out of such tubing and piping. It takes added labor and expense to extract the pipe splitter and pneumatic hammer once they are embedded within the soil.

BRIEF DESCRIPTION OF THE DRAWINGS

FIG. 9B is a cross-sectional view of the pipe pulling assembly shown in FIG. 9A.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
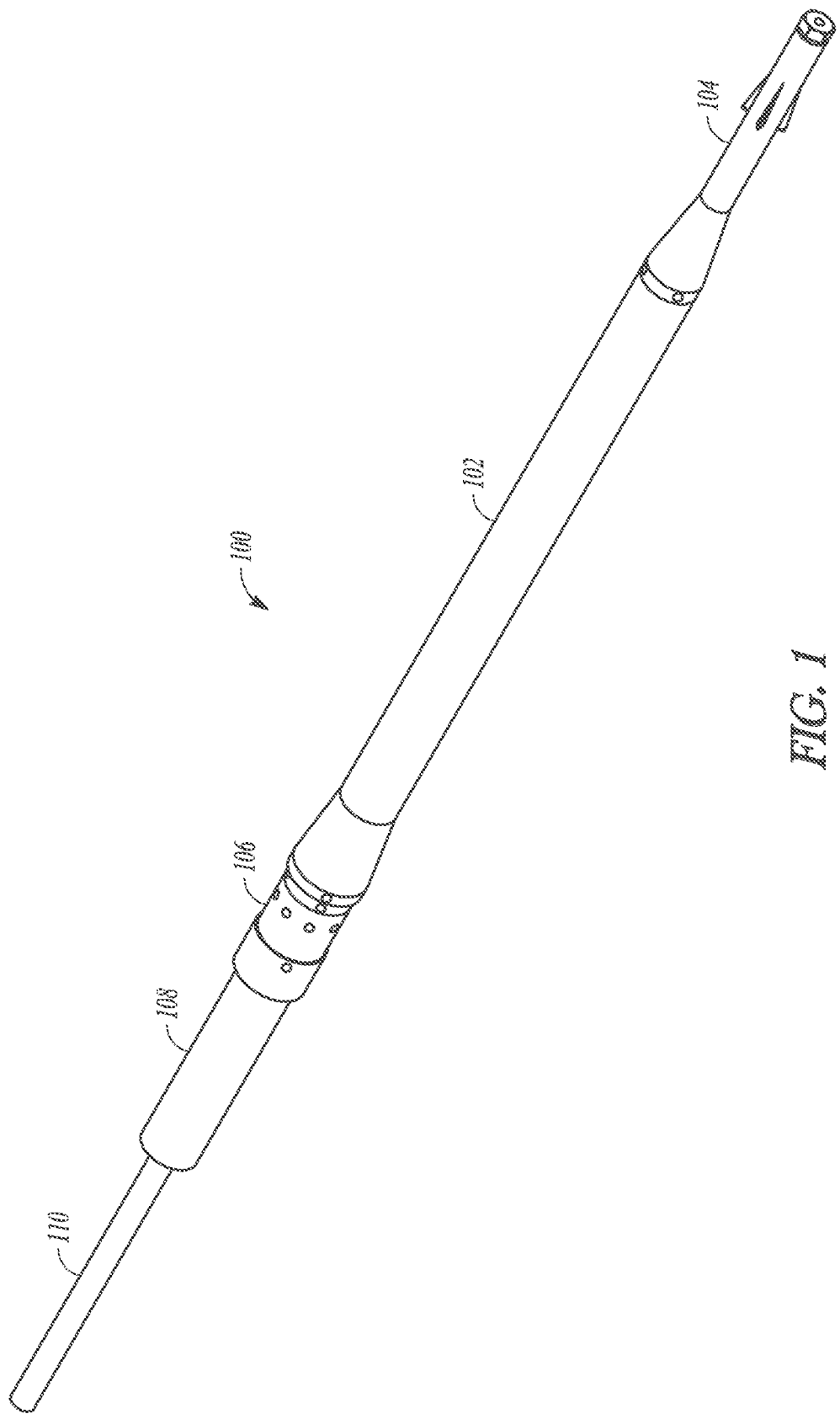
FIG. 1 is a perspective view showing one example of a pipe splitting assembly.

FIG. 1 shows one example of a pipe splitting assembly 100 including a pneumatic hammer 102 and a hammer nose assembly 104. In one example, a pipe pulling assembly 106 is coupled with pneumatic hammer 102. For instance, the pipe pulling assembly 106 is pulled behind the pneumatic hammer 102 as the pipe splitting assembly 100 is pulled and driven to split an existing pipe. The pipe pulling assembly 106 positions a new replacement pipe within the space originally occupied by the existing pipe. An air line 110 is shown in FIG. 1 extending into the pipe pulling assembly 106. The air line 110 is coupled with the pneumatic hammer 102 and provides a source of compressed air to operate the hammer and drive the hammer nose assembly 104 and split the existing pipe.

Figure 2A:
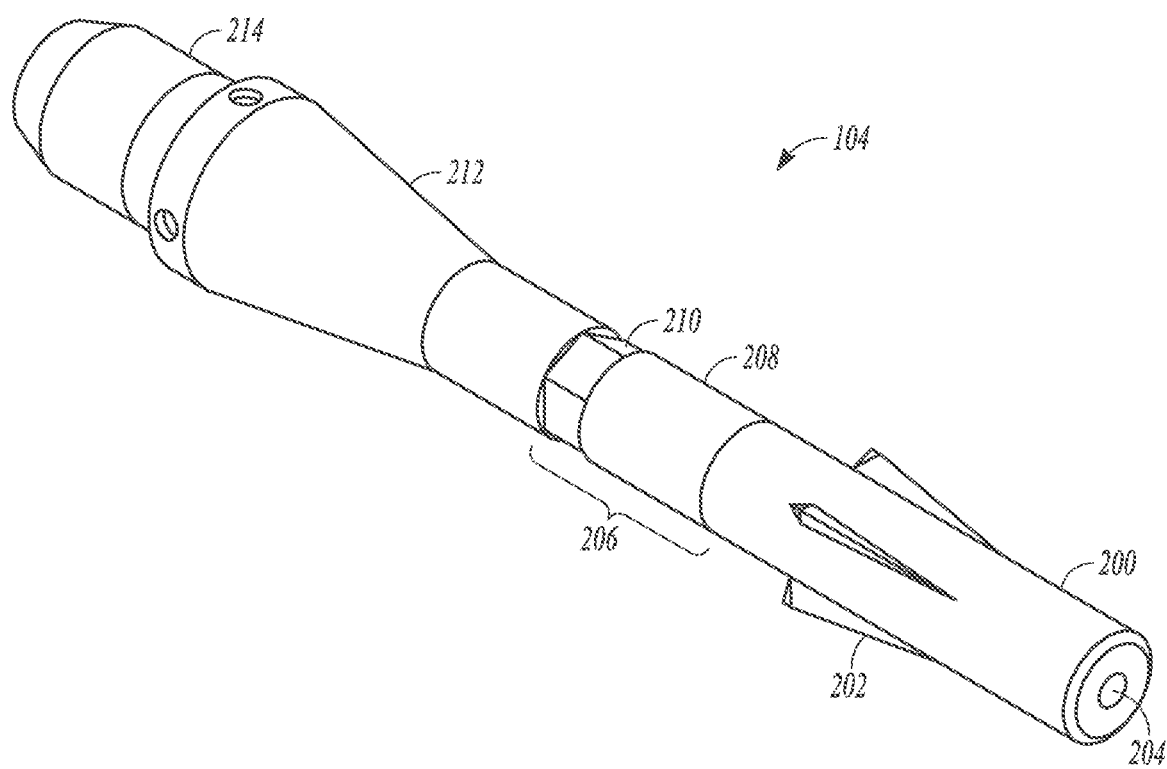
FIG. 2A is a perspective view showing one example of a hammer nose assembly.

One example of a hammer nose assembly 104 is shown in FIG. 2A. The hammer nose assembly 104 includes a pipe splitting cutter 200 (e.g., cutter). The cutter includes cutter blades 202 sized and shaped to engage with an interior of an existing pipe and cut and break apart the existing pipe as the pipe splitting assembly 100 is pulled through. The cutter cable lumen 204 extends through the pipe splitting cutter 200 toward an expander 212. As will be described in further detail below, additional lumens within the hammer nose assembly 104 align with the cutter cable lumen 204 and extend through the other components of assembly 104 to form a composite cable lumen.

As shown in FIG. 2A, the hammer nose assembly 104 includes a rotatable joint 206. In one example, the rotatable joint includes an assembly of joints providing an articulated linkage between expander 212 including a cable coupling therein and the cutter 200. The rotatable joint 206 includes a joint bar 208 extending between the cutter 200 and the expander 212. In another example, a joint nut 216, a part of a cable coupling including the expander 212, is positioned adjacent to the joint bar 208 and forms a portion of the rotatable joint 206.

The hammer nose assembly 104 further includes a hammer coupling 214 sized and shaped to engage and connect with the pneumatic hammer 102. In one example, the hammer coupling 214 includes features to maintain a coupling between the hammer nose assembly 104 and the pneumatic hammer 102 during operation of a pipe splitting assembly 100. Coupling features of the hammer coupling 214 include, but are not limited to, threading, mechanical interfits, mechanical fasteners including pins, screws, bolts and the like.

Figure 2B:
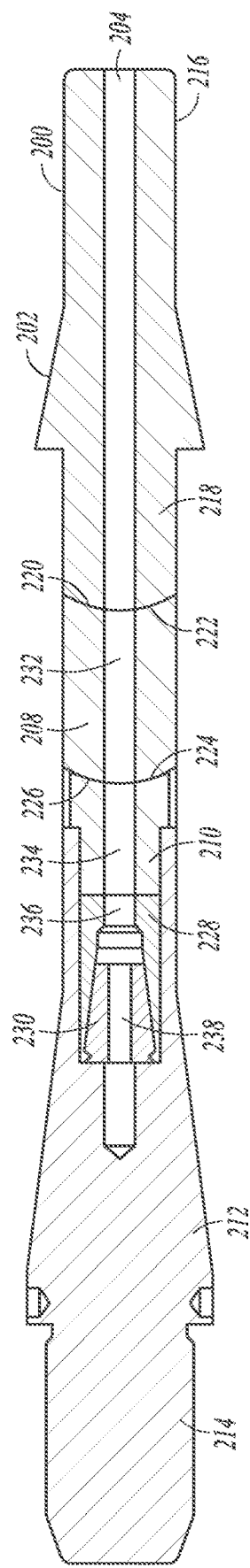
FIG. 2B is a cross-sectional view of the hammer nose assembly shown in FIG. 2A.

Referring now to FIG. 2B, the hammer nose assembly 104 is shown in cross section. As previously described, the hammer nose assembly 104 includes a series of lumens aligned to provide an overall cable lumen extending through the hammer nose assembly from the cutter 200 to the expander 212 (e.g., the cable coupling). For instance, the cutter includes the cutter cable lumen 204, the joint bar includes the joint cable lumen 232, the joint nut 210 includes a nut cable lumen 234, the expander 212 having the cable coupling therewithin includes a housing cable lumen 236 and an anchor cable lumen 238. The composite cable lumen formed by these lumens allows the passage of a cable extending form a winch through the existing pipe through a cutter proximal end 216 to the expander 212 to facilitate connection of each of these components along the cable and transmission of pulling forces through the cable to the expander and into the connective rotatable joint 206 and cutter 200.

The cutter 200 includes a cutter proximal end 216 and a cutter distal end 218. The cutter distal end 218, in one example, includes a cutter fitting 220 sized and shaped for reception within a joint bar socket 222 of the joint bar 208. In a similar manner to the cutter 200 the joint bar 208 includes a joint bar fitting 224 sized and shaped for reception within a joint nut socket 226. As will be described in further detail below, the rotatable joint 206 including the joint bar 208, fittings 220, 224 and sockets 222, 226 enables the hammer nose assembly 104 to articulate relative to the pneumatic hammer 102. For example, the cutter 200 is capable of rotating relative to the expander 212 and the pneumatic hammer 102 coupled with the expander. The fittings 220, 224 and sockets 222, 226 form ball and socket joints and allow rotation of the cutter 200 relative to the pneumatic hammer 102 while enabling the pneumatic hammer 102 to continue providing dynamic percussive forces to the hammer nose assembly 104 including the cutter 200 having the cutter blades 202. The pneumatic hammer 102 is thereby able to drive the cutter 200 through an existing pipe having an elbow or other non-linear shape while substantially preventing wandering of the pneumatic hammer 102 out of the existing pipe. Stated another way, the hammer nose assembly 104 including the rotatable joint 206 provides an articulating guide that navigates the pneumatic hammer 102 through an existing non-linear pipe while also providing a cutter 200 capable of splitting the non-linear portions of the existing pipe where the hammer nose assembly 104 is not otherwise aligned with the pneumatic hammer 102. Additionally, the rotatable joint 206 allows articulation of the cutter 200 relative to the expander 212 including the cable coupling therewithin. Pulling forces transmitted from a winch through the cable extending into the hammer nose assembly 104 are transmitted to the expander 212. The pulling forces transmitted to the expander 212 are further transmitted in compression through the rotatable joint 206. The rotatable joint 206 transmits the pulling forces from the expander 212 into the cutter 200 where the cutter 200 is any angle relative to the expander 212 while the cutter 200 remains engaged with the rotatable joint interposed between the cutter and the expander 212. Put another way, the surfaces of the rotatable joint 206 (e.g., the cutter fitting 220, joint bar fitting 224, socket 222 and joint nut socket 226) are continuously engaged during articulation of the hammer nose assembly 104. Engagement between these sockets and fittings transmits compressive forces to the cutter 200 from pulling of the expander 212 through the hammer nose assembly where the cutter 200 is in substantially any orientation relative to the expander 212 while coupled through the rotatable joint 206.

Referring again to FIG. 2B, the expander 212 is shown in this example with a cable gripping housing 228 coupled around a cable gripping anchor 230. As described in further detail below, the cable gripping anchor 230 extends around a cable extending through the housing cable lumen 236 within the expander 212. Pulling of the cable moves the cable gripping anchor proximally into engagement with the tapered surfaces of the cable gripping housing 228. Engagement of the cable gripping anchor with the cable gripping housing 228 compresses the cable gripping anchor around the cable and forms a tight interfit to anchor the cable within the hammer nose assembly 104. Additional pulling forces from the cable are transmitted into the cable gripping housing 228 and the expander 212 from the cable gripping anchor 230. Pulling forces are thereafter transmitted through the rotatable joint 206 into the cutter 200. Stated another way, the cable gripping anchor 230 and cable gripping housing 228 cooperate to clamp around a cable extending into the anchor cable lumen 238 and housing cable lumen 236.

Figure 3A:
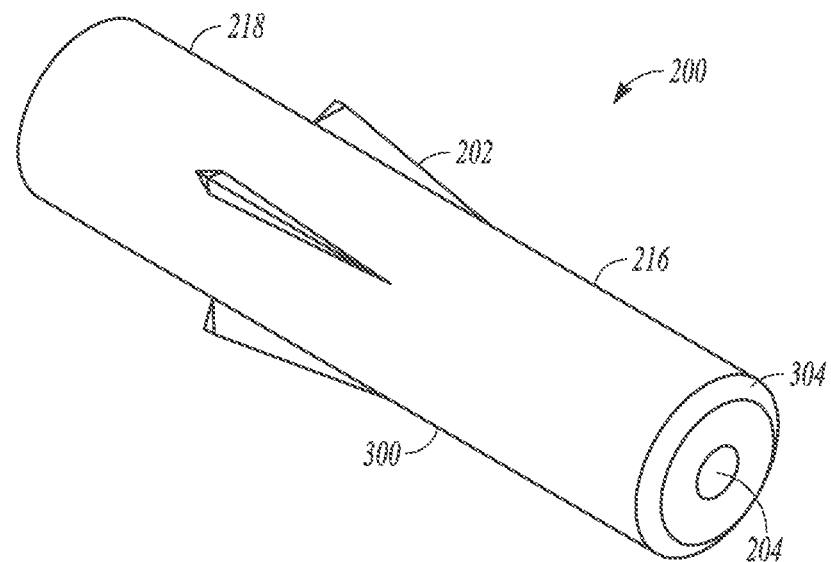
FIG. 3A is a perspective view of the front of one example of a pipe splitting cutter.

One example of a pipe splitting cutter 200 is shown in FIG. 3A. Pipe splitting cutter 200 (e.g., cutter) includes a cutter body 300 extending between the cutter proximal end 216 and cutter distal end 218. The cutter blades 202 are shown positioned around the cutter body 300. In one example, the cutter 200 includes one or more blades positioned around the cutter body 300. In another example, the cutter 200 includes a plurality of blades positioned at different longitudinal positions along the cutter body 300. Optionally, the cutter blades 200 are constructed with but not limited to hardened materials capable of engaging and splitting an existing pipe the hammer nose assembly 104 is pulled and driven through. Additionally, the angles and tapers of the cutter blades 202 are adjustable through the exchange of cutters to enhance the hammer nose assembly cutting capability. In one option, the cutter 200 includes a tapered nose 304. The tapered nose 304 is sized and shaped to engage with the interior of the existing pipe and facilitates movement of the cutter 200 through the existing pipe. Additionally, the tapered nose 304 facilitates movement of the cutter past debris and particulate matter within the existing pipe that would otherwise create an obstacle for the hammer nose assembly 104.

Figure 3B:
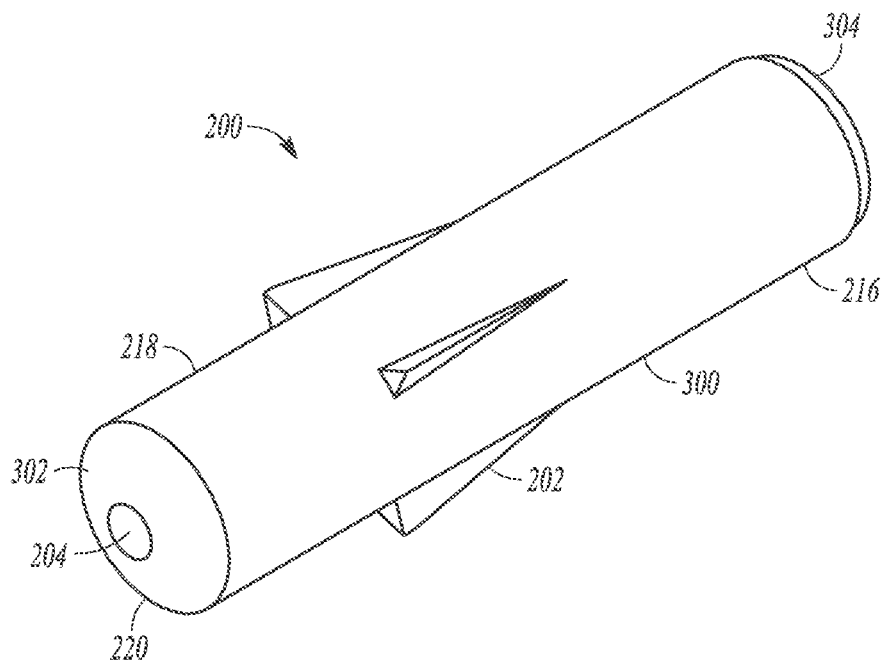
FIG. 3B is a perspective view of the side of the pipe splitting cutter shown in FIG. 3A.

Referring now to FIG. 3B, the cutter body 300 is shown again in a different orientation with the cutter fitting 220 visible. The cutter cable lumen 204 is shown extending through the cutter fitting 220. The cable is fed through the cutter 200 by way of the cutter cable lumen 204 and into the rotatable joint 206 and other components of the hammer nose assembly 104. As shown in FIG. 3B, the cutter fitting 220, in one example, includes a cutter joint surface 302 sized and shaped to rotatably engage with the joint bar socket 220 shown first in FIG. 2B. In one example, the cutter joint surface 302 is rounded to provide a ball surface for engagement with the joint bar socket 222 and facilitate rotation of the cutter 200 relative to the joint bar 208 and expander 212. In another example, the cutter joint surface 302 includes a tapered surface sized and shaped for engagement with a surface of the joint bar socket 222 (e.g., the surface of the joint bar socket 222) that is correspondingly tapered to the tapered surface of the cutter joint surface 302.

Figure 3C:
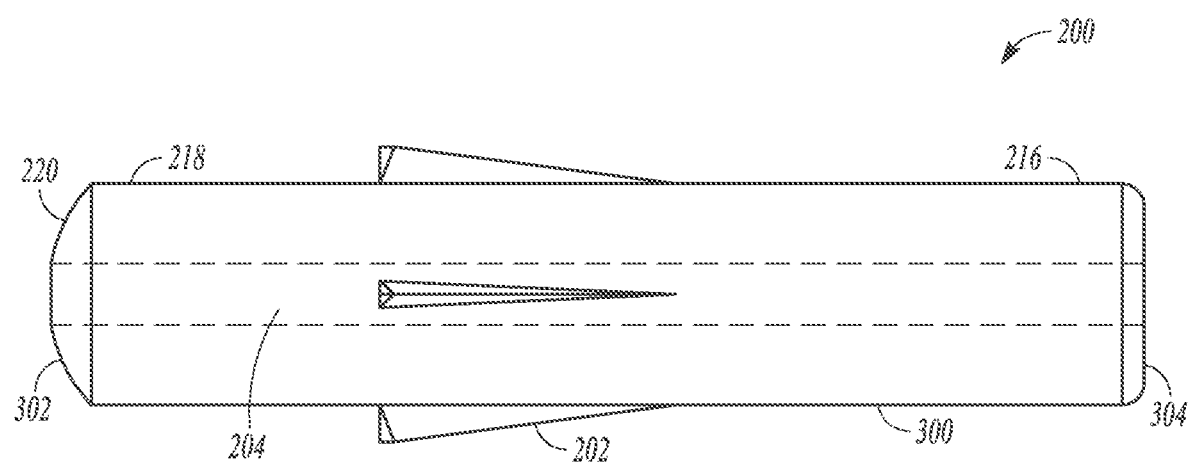
FIG. 3C is a side view of the pipe splitting cutter shown in FIG. 3A.

Referring now to FIG. 3C, another view of the cutter 200 is shown. The cutter cable lumen 204 extends through the cutter body 300 from the cutter proximal end 216 through the cutter distal end 218 and out of the cutter fitting 220. As described above, the cutter joint surface 302 includes a rounded surface sized and shaped for engagement with the corresponding rounded surfaces of the joint bar socket 222 shown in FIG. 2B. The cutter 200 shown in FIGS. 3A through 3C is the proximal portion of the hammer nose assembly 104 drawn through an existing pipe to split the existing pipe. The cutter 200 articulates relative to the remainder of the hammer nose assembly 104 including the rotatable joint 206 and the expander 212. Stated another way, the rotatable joint 206 facilitates rotation of the cutter 200 relative to the expander 212 as the cutter 200 navigates non-linear piping including elbows, bends, irregularities and the like as well as otherwise linear pipes. While the cutter 200 is articulated pulling forces and dynamic percussive forces from the pneumatic hammer 102 (FIG. 1) are transmitted through the hammer nose assembly 104 and into the cutter 200 to drive the cutter through the existing pipe and split the existing pipe.

Figure 4A:
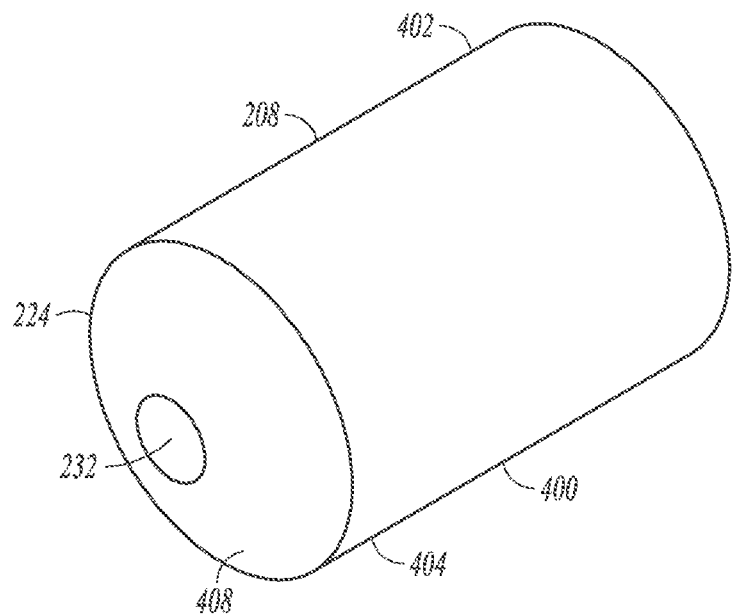
FIG. 4A is a perspective view of the rear of one example of a joint bar used in a rotatable joint of a hammer nose assembly.
Figure 4B:
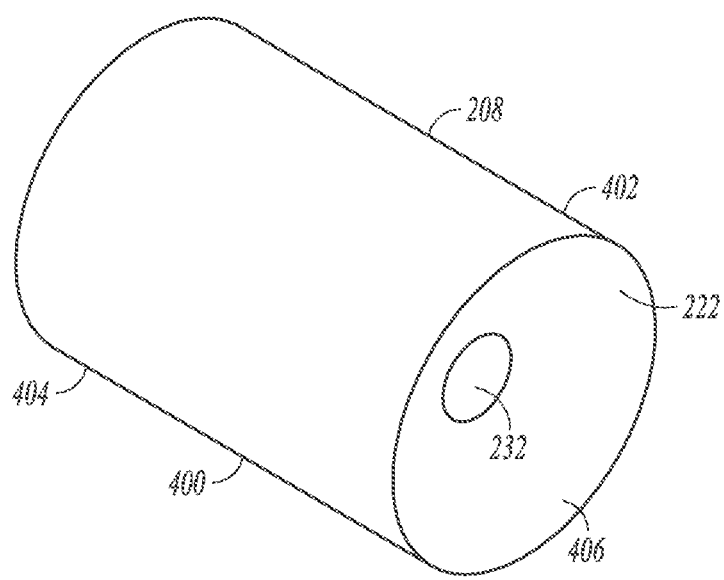
FIG. 4B is a perspective view of the rear of one example of the joint bar shown in FIG. 4A.
Figure 4C:
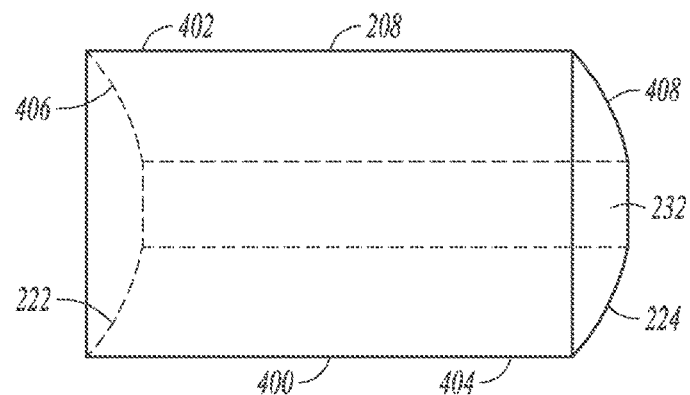
FIG. 4C is a side view of the joint shown in FIG. 4A.

The joint bar 208 originally shown in FIG. 2A is shown in detail in FIGS. 4A-C. The joint bar 208 extends from a joint bar proximal end 402 to a joint bar distal end 404. The joint cable lumen 232 extends through the joint bar body 400 from the proximal end 402 to the distal end 404. Referring to FIG. 4B, the joint bar proximal end 402 includes the joint bar socket 222 having a first bar joint surface 406. The first bar joint surface 406, in one example, has a shape corresponding to the shape of the cutter fitting 220 shown in FIG. 3C. Corresponding shapes between the first bar joint surface 406 and cutter joint surface 302 facilitate easy rotation of the cutter 200 relative to the joint bar 208. Stated another way, the rounded first bar joint surface 406 and corresponding rounded cutter joint surface 302 form a first ball and socket joint sized and shaped to permit rotation of the cutter 200 relative to the expander 212. Referring to FIG. 4A, the joint bar fitting 224 includes a second bar joint surface 408 having a corresponding surface to the joint nut fitting 226 of the joint nut 210.

Figure 5A:
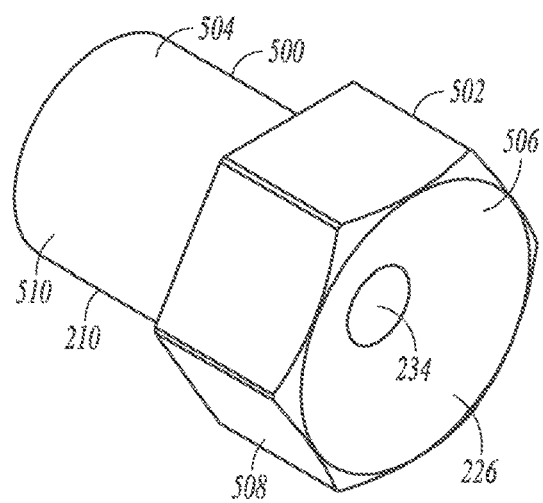
FIG. 5A is a perspective view of one example of a joint nut used in a rotatable joint of a hammer nose assembly.
Figure 5B:
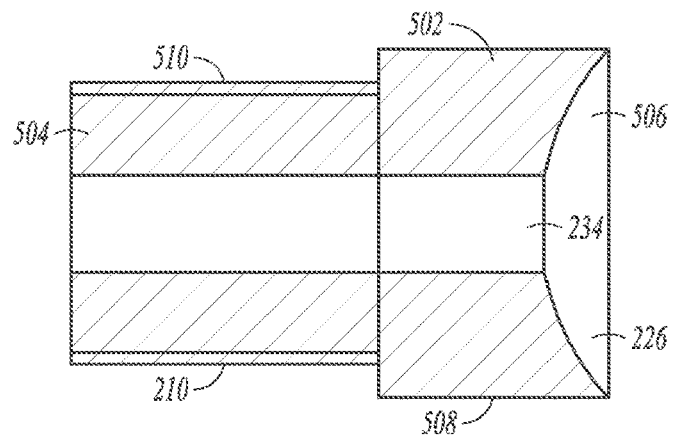
FIG. 5B is a side view of the joint nut shown in FIG. 5A.

FIGS. 5A and 5B show one example of a joint nut 210, also shown in FIG. 2A. The joint nut 210 includes a joint body 500 extending between a joint nut proximal end 502 and a joint nut distal end 504. As previously described, the hammer nose assembly 104 includes an overall cable lumen extending through the assembly to allow coupling with the cable extending into the cable coupling features of the expander 212. The joint nut 210 includes a nut cable lumen 234 extending between the joint nut proximal end and joint nut distal end 502, 504, respectively. The nut cable lumen 234 allows for passage of a cable through the joint nut and into the expander 212. As previously described above, the joint nut 210, in one example, is part of the expander 212 where the expander 212 and the joint nut 210 are a cable coupling configured to anchor the cable therein and transmit pulling forces from the cable to the hammer nose assembly 104. The joint nut 210, in one example, includes a tool engagement surface 508. As shown in FIG. 5A, the tool engagement surface 508 is a hexagonal shape for engagement with tools including wrenches and the like. The tool engagement feature 508, in another example, cooperates with a nut coupling feature 510 near the joint nut distal end 504. The nut coupling feature includes but is not limited to threading, mechanical fittings, adhesives and the like configured to engage the joint nut 210 with the expander 212. Referring again to FIG. 2B, the nut coupling feature 510 is positioned within the expander 212. The nut coupling feature 510 facilitates coupling between the expander 212 and the joint nut 210 to retain the cable gripping housing 228 and cable gripping anchor 230 within the expander 212. Retention of the cable gripping housing and cable gripping anchor 228, 238 within the expander 212 by way of the joint nut 210 ensures pulling forces from the cable are transmitted to the remainder of the hammer nose assembly 104.

Referring again to FIGS. 5A, 5B the joint nut socket 226 is part of the rotatable joint 206 and includes a nut joint surface 506. In one example, the nut joint surface 506 has a corresponding shape to the second bar joint surface 408 of the joint bar 208 (FIGS. 4A, C). The joint nut socket 226 including the nut joint surface 506 couples with the joint bar fitting 224 having the second bar joint surface 408 to form a second ball and socket joint of the rotatable joint 206 shown in FIGS. 2A, B. Because the second bar joint surface 408 and nut joint surface 506 have corresponding shapes surface to surface contact between the joint nut socket 226 and joint bar fitting 224 is maintained throughout articulation of the hammer nose assembly 104. Stated another way, as the pipe splitting cutter 200 shown in FIGS. 2A, B is articulated relative to the expander 212 and the pneumatic hammer 102 the surfaces of the cutter fitting 220, joint bar socket 222, joint bar fitting 224 and joint nut socket 226 maintain surface to surface contact and thereby allow continuous transmission of compressive pulling forces from the expander 212 into the cutter 200. Similarly, the rotatable joint 206 including these fittings and sockets facilitates continuous transmission of dynamic percussive forces from the pneumatic hammer 102 through the hammer nose assembly 104 and into the cutter 200.

Figure 6A:
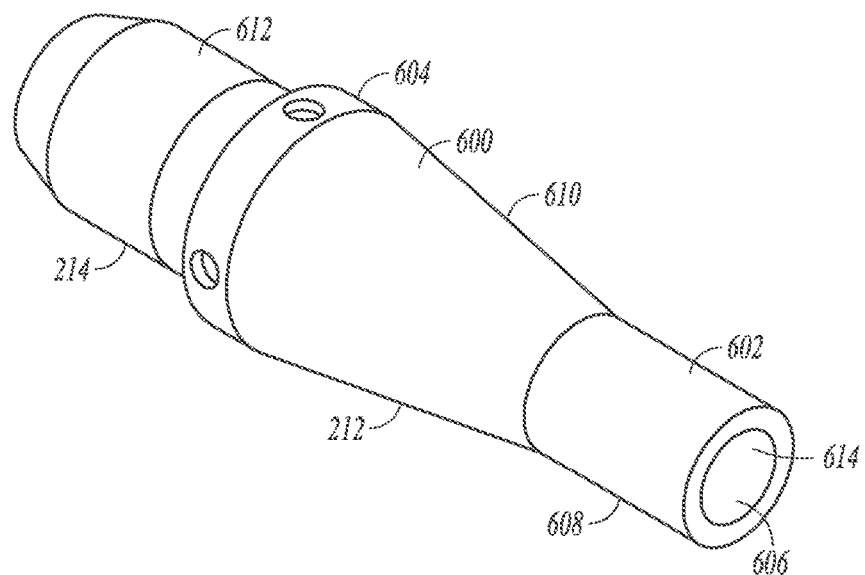
FIG. 6A is a perspective view of one example of a cable coupling including an expander.
Figure 6B:
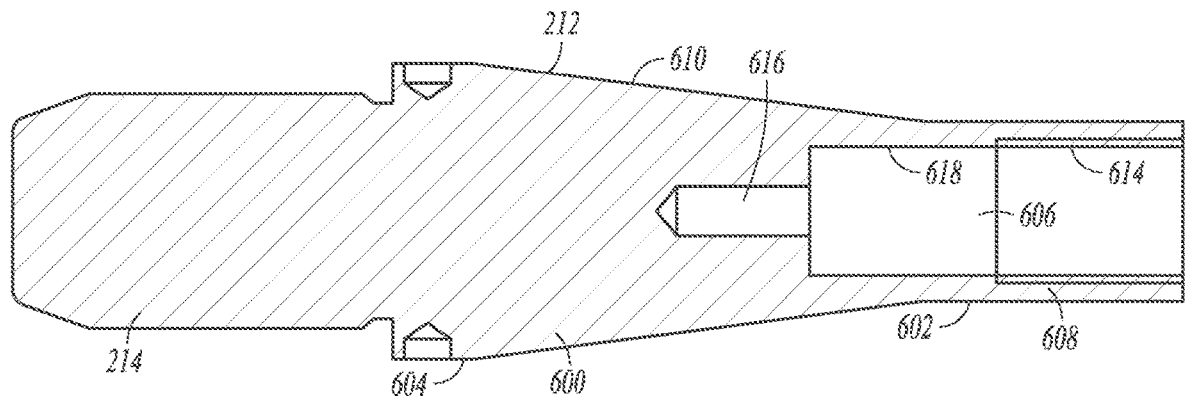
FIG. 6B is a cross-sectional view of the cable coupling shown in FIG. 6A.

Referring now to FIG. 6A, 6B, one example of an expander 212 (originally shown in FIGS. 2A and 2B) is provided including an expander body 600. The expander body 600 extends between an expander proximal end 602 and expander distal end 604. The expander body 600 includes an expander taper 610 extending between the expander proximal end 602 and expander distal end 604. In the example shown in FIGS. 6A and 6B, the expander taper 610 tapers from the distal end 604 toward the proximal end 602. The expander perimeter near the expander distal end 604 is larger than the perimeter of the cutter 200. After the cutter 200, including the cutting blades 202 engages and splits an existing pipe the expander 212, including the expander taper 610 engages against the split pipe and pushes the pipe away from the pipe splitting assembly 100 to allow for a replacement pipe, such as replacement 108 shown in FIG. 1, to be pulled into the vacant position originally held by the existing pipe.

The expander 212 includes expander barrel 608 with a cable gripping recess 606 extending therethrough (See FIG. 6B). The cable gripping recess 606 is sized and shaped to retain the cable gripping housing 228 and cable gripping anchor 230 (see FIG. 2B). A recess inner surface 618 defining the cable gripping recess 606 extends around the cable gripping housing 228 and cable gripping anchor 230. In one example, the expander 212 includes an expander coupling feature 614 extending along the recess inner surface 618. The expander coupling feature 614 is configured to cooperate with the nut coupling feature 510 of the joint nut 210. The joint nut 210 is capable of being fixed within the expander 212 to retain the cable gripping housing 228 and cable gripping anchor 230 therein. In another option, the expander 212 includes a cable recess 616 sized and shaped to receive excess cable extending through the cable gripping anchor 230 (FIG. 2B). The cable gripping anchor 230 and cable gripping housing 228 are positionable within the cable gripping recess 606 with excess cable extending out of a distal end of the cable gripping anchor 230 and into the cable recess 616. As the cable is pulled proximally toward the cutter 200 shown in FIG. 2B a small amount of the excess cable slides through the cable gripping anchor 230 as the cable gripping anchor moves into locking engagement with the cable gripping housing 228. The cable gripping anchor 230 clamps along the remainder of the cable extending through the anchor and anchors the cable to the expander 212 and the hammer nose assembly 104.

Figure 7A:
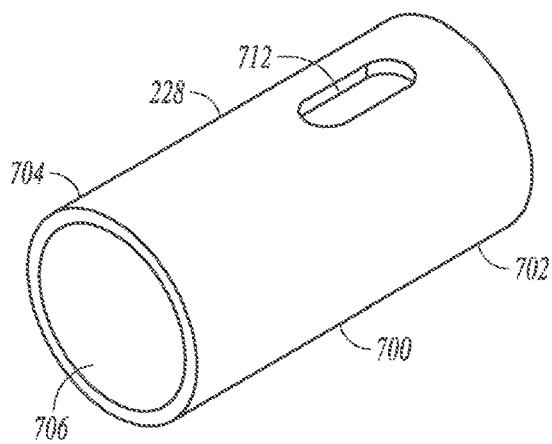
FIG. 7A is a perspective view of the rear of one example of a cable gripping housing.
Figure 7B:
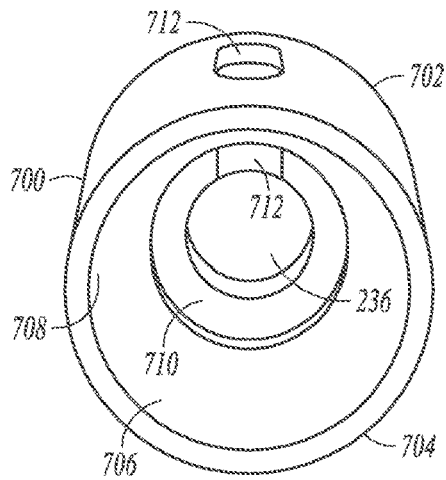
FIG. 7B is a perspective view of the front of the cable gripping housing shown in FIG. 7A.
Figure 7C:
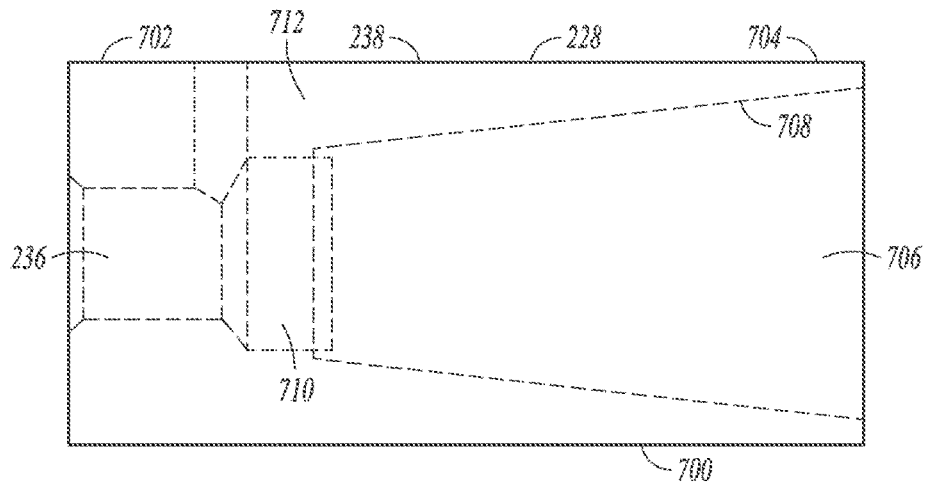
FIG. 7C is a cross-sectional view of the cable gripping housing shown in FIG. 7A.

FIGS. 7A-C show a detailed example of the cable gripping housing 228 shown in FIG. 2. The cable gripping housing 228 includes a housing body 700 extending between a housing proximal end 702 and a housing distal end 704. Referring to FIGS. 7B, C, the cable gripping housing 228 includes an anchor recess 706 extending from the housing distal end 704 toward the housing proximal end 702. In one example, the anchor recess 706 extends into an anchor gap 710 near the housing proximal end 702. The anchor recess 706 and anchor gap 710 are in communication with the housing cable lumen 236. As described in previous examples, the housing cable lumen 236 is part of an overall cable lumen extending through the hammer nose assembly 104. A cable such as a cable extending from the cable gripping anchor 230 shown in FIG. 2 extends through the anchor recess 706, anchor gap 710 and housing cable lumen 236 and continues on through the hammer nose assembly 104 toward the cutter 200. The anchor recess 706 is sized and shaped to contain the cable gripping anchor 230 as described above. The anchor recess 706 includes a housing tapered surface 708 sized and shaped to engage with the anchor. As the anchor is pulled proximally engagement between the anchor and the housing tapered surface 708 forces the anchor to compress around the cable and locks the cable and anchor 230 together.

In yet another example, the housing body 700 of the cable gripping housing 228 includes a tool access groove 712 extending from the exterior of the housing body 700 into the anchor gap 710. The tool access groove 712 provides access for a tool such as a wrench, pry bar and the like to the cable gripping anchor 230 within the anchor recess 706. The tool is used to pry the cable gripping anchor 230 out of engagement with the housing tapered surface 708 to free the cable from the anchor 230 and the cable gripping housing 228. The anchor gap 710 and tool access groove 712 are sized and shaped to permit engagement of the tool with the housing proximal end 702. Put another way, the tool access groove 712 and anchor gap 710 are sufficiently large to provide space for a tool to reach the anchor proximal end and engage with the anchor to pry the cable gripping anchor 230 out of engagement with the housing tapered surface 708.

Figure 8A:
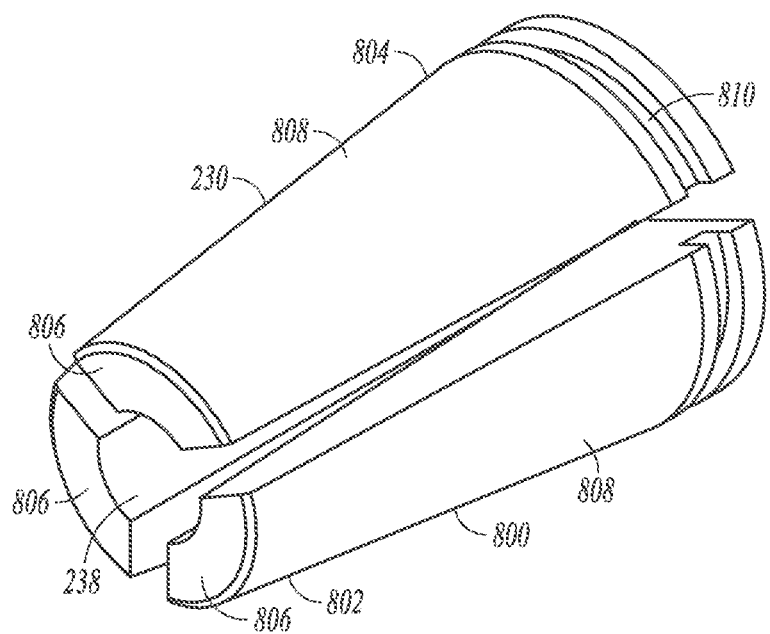
FIG. 8A is a perspective view of one example of a cable gripping anchor.
Figure 8B:
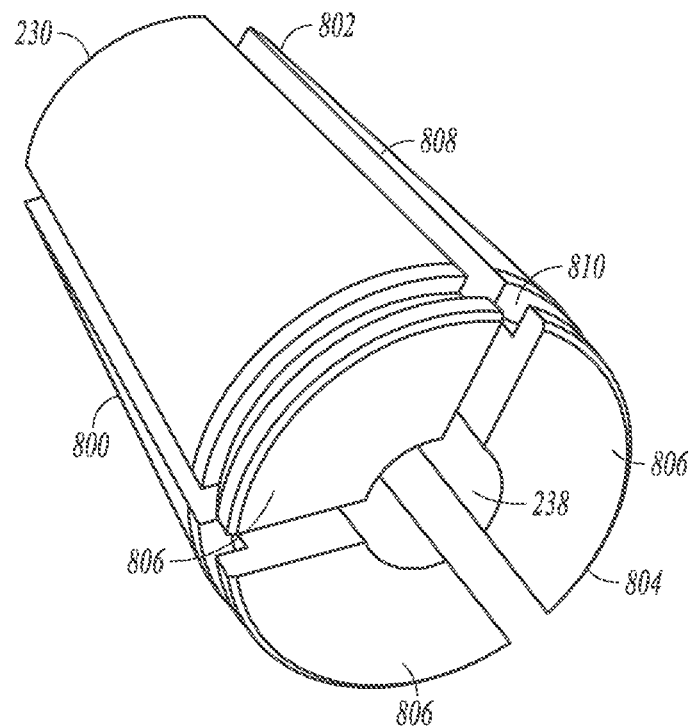
FIG. 8B is a perspective view of the rear of the cable gripping anchor shown in FIG. 8A.

An example of a cable gripping anchor 230 is shown in FIGS. 8A and 8B. The cable gripping anchor 230 is also shown in FIG. 2B engaged within the cable gripping housing 228. The cable gripping anchor 230 includes an anchor body 800 extending from an anchor proximal end 802 toward an anchor distal end 804. As shown in FIGS. 8A and 8B, the anchor body 800, in one example, is composed of one or more anchor jaws 806. The anchor jaws 806 extend around the anchor cable lumen 238 where the cable will extend when the pipe splitting assembly 100 is assembled. The anchor body 800 including the anchor jaws 806 includes a tapered anchor surface 808 having a shape corresponding to the housing tapered surface 708 shown in FIG. 7C. As described in further detail below, the tapered anchor surface 808 is sized and shaped to engage with the housing tapered surface 708 and compress the cable gripping anchor 230 around the cable thereby locking the assembly of the cable gripping anchor and cable gripping housing 228 on the cable. The tapered anchor surface 808 tapers from the anchor distal end 804 toward the anchor proximal end 802. Near the anchor distal end 804 a retaining band groove 810 extends around the anchor body 800. The retaining band groove 810 is sized and shaped to receive a retaining band, such as an elastomeric band. When the retaining band is positioned within the retaining band groove 810 the separate anchor jaws 806 are retained around the anchor cable lumen 238 and the cable. The retaining band ensures the anchor body 800 remains in an assembled state around the cable before the cable gripping anchor 230 is engaged with the cable gripping housing 228.

In operation, a cable is positioned within the cable gripping anchor 230 (see FIG. 2B) after the cutter 200, joint bar 208, joint nut 210 and the cable gripping housing 228 are positioned on the cable. The expander 212 is coupled with the joint nut 210. As the cable is pulled proximally, for instance, by a rotating spool at one end of an existing pipe the cable gripping anchor 230 is correspondingly pulled with the cable due to friction between the cable and the interior surface of the anchor engaged along the cable (e.g., through a retaining band within the retaining band groove 810). Movement of the cable gripping anchor 230 proximally engages the tapered anchor surface 808 with the housing tapered surface 708. Continued movement of the cable gripping anchor 230 into the housing tapered surface 708 compresses the anchor jaws 806 around the cable and clamps the cable gripping anchor 230 around the cable. The cable gripping anchor is locked in place between the cable and the cable gripping housing 228. The cooperative engagement between the housing 228, anchor 230 and the cable locks the cable in place relative to the cable gripping anchor 230 and cable gripping housing 228.

Continued proximal pulling of the cable transmits pulling forces from the cable gripping anchor 230 and cable gripping housing 228 to the cable coupling 212 (e.g., the expander 212 and the joint nut 210). The pulling forces from the cable are transmitted proximally through the hammer nose assembly 104 by compression. Compressive forces are transmitted from the joint nut 210 into the rotatable joint 206. As discussed above, the rotatable joint 206 allows articulating movement of the cutter 200 relative to the cable coupling (e.g., the expander 212 and the joint nut 210) and pneumatic hammer 102. The compressive forces are transmitted through the rotatable joint 206 to the cutter 200 throughout rotation of the cutter relative to the cable coupling. Stated another way, the surface to surface contact between the cutter fitting 220, joint bar socket 222, joint bar fitting 224 and joint nut socket 226 of the rotatable joint 206 continuously transmits compressive forces from the cable into the cutter 200 as the cutter navigates non-linear pipes, curves, bends, elbows and the like. Compressive forces transmitted from the expander 212 containing the anchor 230 to the cutter 200 in any angled orientation relative to the expander drive the cutting blades 202 and split the existing pipe.

In a similar manner, the pneumatic hammer 102 transmits dynamic percussive forces through the hammer coupling 214 of the expander 212. The percussive forces are transmitted into the joint nut 210 where they are then transmitted through the rotatable joint 206 and into the cutter 200 where the cutter in substantially any rotatable orientation relative to the expander 212. To put it another way, the dynamic percussive forces from the pneumatic hammer 102 are transmitted through the expander 212 and through the rotatable joint 206 through the continuous surface to surface contact between the cutter fitting 220, joint bar socket 222, joint bar fitting 224 and joint nut socket 226 into the cutter 200. The cutter 200 is thereby able to articulate relative to the pneumatic hammer 102 and expander 212 throughout navigation of the pipe splitting assembly 100 through non-linear pipes, elbows, bends and the like. Navigation of the hammer nose assembly 104 through an existing non-linear pipe, a pipe having a bend, curve and the like guides the pneumatic hammer 102 toward and through the non-linear portion of the pipe and similarly guides the dynamic percussive forces of the pneumatic hammer 102 into the cutter 200 within those non-linear portions. Guiding of the pneumatic hammer 102 substantially prevents wandering of the pneumatic hammer outside of the existing pipe. That is to say, the hammer nose assembly 104 guides the pneumatic hammer 102 and reduces the likelihood the hammer drives outside of the existing pipe and becomes lodged within surrounding soil and rock. The articulating hammer nose assembly 104 thereby provides an unexpected benefit along with transmission of percussive forces through the rotatable joint 206 to the articulated cutter 200 in that the hammer nose assembly 104 acts as a guide to direct the pneumatic hammer 102 along a non-linear portion of the pipe while preventing the pneumatic hammer from driving itself out of the existing pipe. For example, where the existing pipe includes piping or tubing that was laid from a spool, the pipe is naturally non-linear as it is unrolled and buried. The hammer nose assembly 104 articulates relative to the pneumatic hammer 102 as it is pulled through the non-linear pipe. The pneumatic hammer 102 drives the cutting blades 202 of the articulated cutter 200 through the existing pipe while the hammer nose assembly 102 guides the hammer through the non-linear pipe and prevents wandering of the hammer outside of the pipe.

After operation of the pipe splitting assembly 100 the pipe splitting assembly is disassembled and removed from the cable used to draw it through the existing pipe. A tool is inserted into the tool access groove 712 shown in FIGS. 7A-C. The tool is positioned within the anchor gap 710 proximal to the anchor proximal end 802 (see FIGS. 8A, B). As shown in FIG. 2B and shown in further detail in FIG. 7C, the anchor gap 710 is sized and shaped to receive the anchor proximal end 802 while still providing sufficient room for insertion of the tool proximal adjacent to the anchor proximal end 802. The tool is operated, for instance, with a prying motion pivoted on the surfaces defining the tool access group 712. The prying motion forces the cable gripping anchor 230 out of engagement with the housing tapered surface 708 of the cable gripping housing 228. After disengagement of the cable gripping anchor 230 from the cable gripping housing 228 the cable is free to slide relative to the hammer nose assembly 104.

Referring to FIG. 2B, in another example prior to disengagement of the cable gripping anchor 230 from the cable gripping housing 228, the cutter 200, joint bar 208 and joint nut 210 are slid down the cable from the expander 212. Optionally, the joint nut 210 is unfastened from the expander 212 allowing movement of the joint nut 210 on the cable relative to the expander 212. Without the joint nut 210 engaged with the expander 212 the cable gripping housing 228 and cable gripping anchor 230 are removed from the expander 212 to expose the tool access groove 712 of the cable gripping housing. A tool is then inserted to disengage the cable gripping anchor 230 from the cable gripping housing 228 as described above. The anchor 230 and housing 228 are then removed from the cable, and the joint nut 210, joint bar 208 and cutter 200 are slid off the cable.

In addition to guiding the pneumatic hammer 102 through an existing pipe, the articulated hammer nose assembly 104 is also configured to guide the pipe pulling assembly 106 shown in FIG. 1. By navigating the articulated hammer nose assembly 104 through an existing pipe the hammer nose assembly 104 pulls the pipe pulling assembly 106 and the replacement pipe 108 extending behind the pipe pulling assembly into the space originally assumed by the existing pipe. The replacement pipe 108 navigates through the surrounding soil in the same manner as the hammer nose assembly 104 and the pneumatic hammer 102 and correspondingly follows the route of the original existing pipe.

Figure 9A:
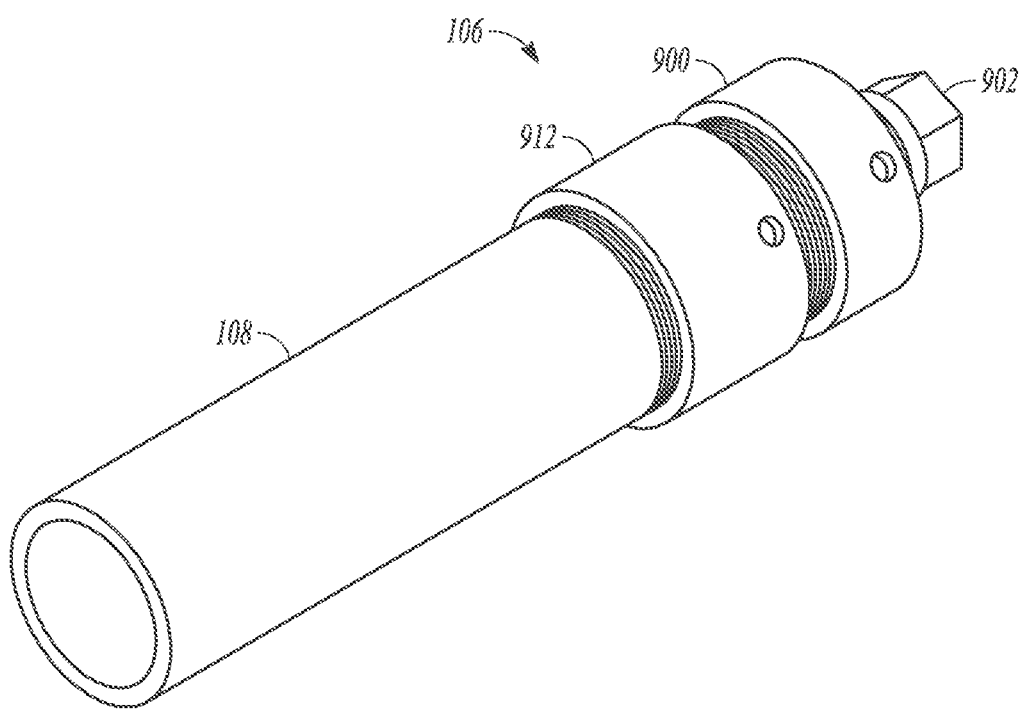
FIG. 9A is a perspective view of one example of a pipe pulling assembly.

One example of a pipe pulling assembly 106 is shown in FIGS. 9A and 9B. The pipe pulling assembly 106 includes a pipe puller adapter 900 coupled with a pipe puller 912 fastened to the replacement pipe 108. The pipe puller adapter 900 is coupled between the pipe puller 912 and the pneumatic hammer 102 shown in FIG. 1. In one example, a hammer nut 902 is engaged with the pipe puller adapter 900 and fastens the pipe puller adapter 900 to the pneumatic hammer 102. As shown in FIG. 9B, the hammer nut 902 includes a nut coupling feature 906 including, but not limited to, threading, mechanical interfitting surfaces, fasteners and the like sized and shaped to engage with an adapter coupling feature 908. The hammer nut 902 shown in FIG. 9B further includes an air line lumen 910 sized and shaped to pass the air line 110 shown in FIG. 1 through the pipe pulling assembly 106 and into the pneumatic hammer 102. The air line 110 provides the compressed air used to operate the pneumatic hammer 102. Referring again to FIGS. 9A and 9B, the pipe pulling assembly 106 is coupled with the replacement pipe 108. The pipe puller 912 includes a puller coupling feature 914 (See FIG. 9B) sized and shaped for coupling with a replacement pipe coupling feature 916. The coupling features 914, 916 include but are not limited to threading, mechanical interfitting surfaces, fasteners adhesives, welds and the like.

Figure 10A:
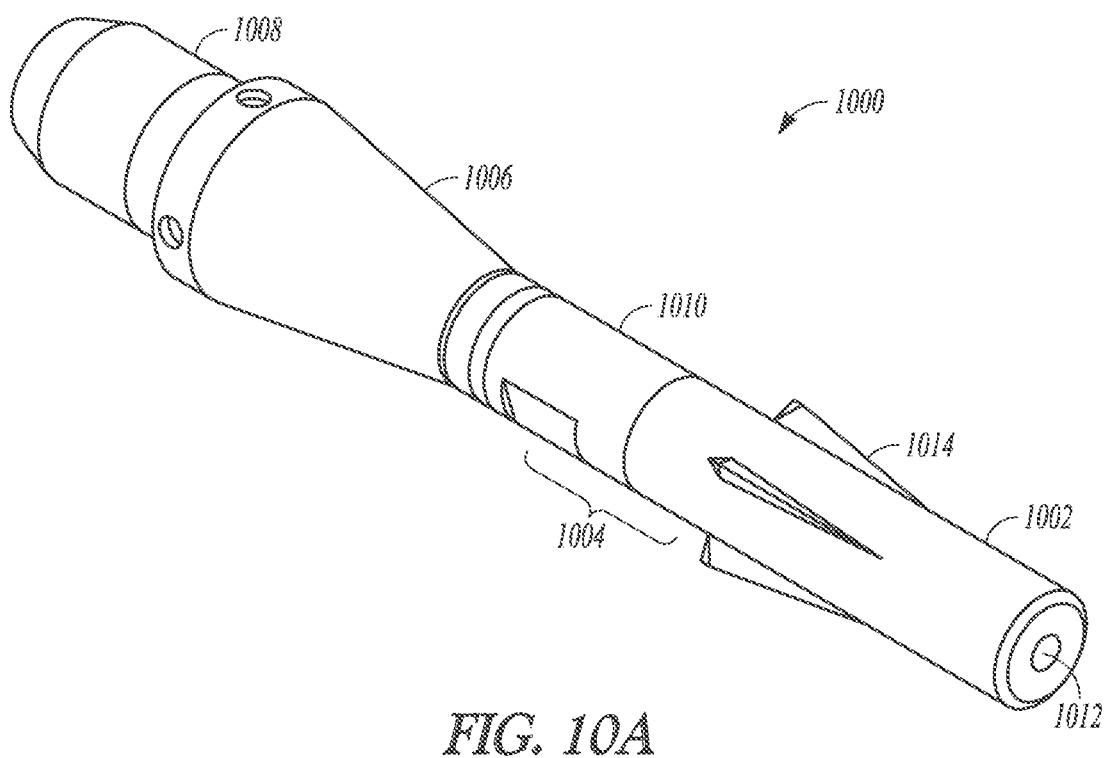
FIG. 10A is a perspective view of another example of a hammer nose assembly.
Figure 10B:
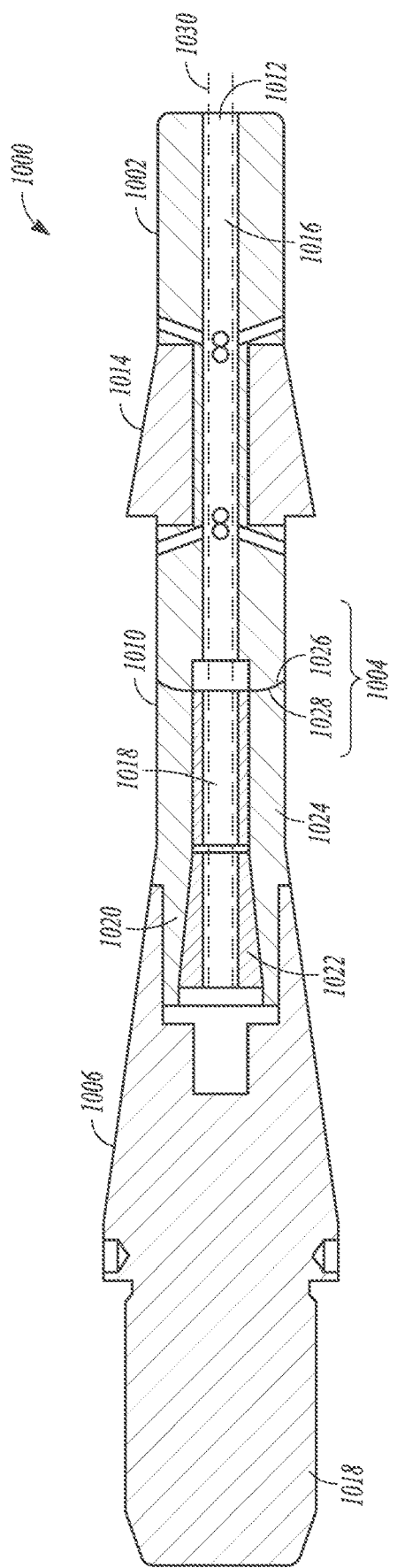
FIG. 10B is a cross-sectional view of the hammer nose assembly shown in FIG. 10A.

FIGS. 10A and 10B show another example of a hammer nose assembly 1000. The hammer nose assembly 1000 is configured for coupling with the pneumatic hammer 102 and pipe pulling assembly 106 shown in FIG. 1. The hammer nose assembly 1000 includes a pipe splitting cutter (e.g., a cutter) 1002 coupled with an expander 1006 through a rotatable joint 1004. The hammer coupling 1008 is included, in one example, with the expander 1006. The hammer coupling 1008 is sized and shaped for coupling with the pneumatic hammer 102. In some regards the hammer nose assembly 1000 includes similar components and is used in a similar manner to the hammer nose assembly 104 shown in FIGS. 1, 2A and 2B. For instance, the hammer nose assembly 1000 is articulated relative to the expander 1006 and the pneumatic hammer 102 thereby allowing the hammer nose assembly 1000 to navigate a non-linear pipe or tube and provide a guide for the pneumatic hammer 102 as the pipe splitting assembly 100 is pulled and driven through an existing pipe.

The cutter 1002 is shown in cross section in FIG. 10B and includes replaceable cutting blades 1014. The replaceable cutting blades 1014 are modular and sized and shaped for replacement and exchange with the cutter 1002. For instance, the cutter blades 1014 include a variety of sizes, materials and shapes. Each of the cutter blades 1014 (varied in size, material or shape) are positionable within recesses of the cutter 1002 and used to split a variety of pipe and tube diameters, pipe and tube materials and the like.

The rotatable joint 1004 is shown in FIGS. 10A, B and includes one or more joints. As shown in FIG. 10B, the rotatable joint 1004 includes a single joint including a cutter fitting 1026 of the cutter 1002 positioned within a joint bar socket 1028 of the joint bar 1010. As previously described above, the rotatable joint 1004 in a similar manner to the rotatable joint 106, maintains surface to surface contact between the cutter 1002 and joint bar 1010 through contact of the cutter fitting 1026 and joint bar socket 1028. Compressive pulling forces transmitted from the expander 1006 are thereby continuously transmitted into the cutter 1002 to split the existing pipe. Further, the continuous surface to surface contact of the cutter fitting 1026 and joint bar socket 1028 of the rotatable joint 1004 throughout articulation of the cutter 1002 relative to the expander 1006 permits transmission of percussive forces from the pneumatic hammer 102 through the expander 1006 and into the cutter 1002. Dynamic percussive forces are transmitted through the joint bar 1010 into the cutter 1002 where the cutter is at substantially any angle of the cutter 1002 relative to the pneumatic hammer 102 and expander 1006 (e.g., an angle of around 20 degrees or less relative to the hammer and expander).

In the example shown in FIG. 10B, the cable gripping housing 1020 and cable gripping anchor 1022 are included within the joint bar 1010. The cable gripping housing and cable gripping anchor 1020, 1022 are consolidated with the joint bar 1010 to provide a single assembly that facilitates articulation of the cutter 1002 relative to the expander 1006 and pneumatic hammer 102 and anchors the assembly along a cable for pulling the pipe splitting assembly 100 through an existing pipe. As shown in FIG. 10B, a cable lumen 1012 extends through the hammer nose assembly 1000 to the cable gripping housing and cable gripping anchor 1020, 1022. As described with the hammer nose assembly 104, the cable lumen 1012 is a composite lumen including a cutter cable lumen 1016 and the joint cable lumen 1018. The cable lumen 1012 extending through the hammer nose assembly 1000 thereby allows the passage of a cable through the hammer nose assembly into the cable gripping housing and cable gripping anchor 1020, 1022. Stated another way, the cutter 1002 and joint bar 1010 are threaded over the cable toward the cable gripping anchor 1022 during assembly of the hammer nose assembly 1000. In FIG. 10B a cable 1030 is shown in phantom lines extending through the cable lumen 1012 from the cutter 1002 to the cable gripping anchor 1022. When assembled, the cable 1030 maintains the cutter 1002 in surface to surface contact with the joint bar 1010 during articulation of the cutter 1002 relative to the expander 1006 and pneumatic hammer 102. To put it another way, the cable 1030 provides a flexible fastener between the cutter 1002 and joint bar 1010 and maintains the cutter 1002 in surface to surface contact with the joint bar 1010 at the rotatably joint 1004 throughout articulation of the cutter relative to the expander and the pneumatic hammer 102.

Optionally, the hammer nose assembly 1000 includes an anchor jack 1024 positioned adjacent to the cable gripping anchor 1022 (See FIG. 10B). As will be described in further detail below, the anchor jack 1024 is operated to disengage the cable gripping anchor 1022 from the gripping housing 1020 when disassembly of the hammer nose assembly 1000 is desired.

Figure 11A:
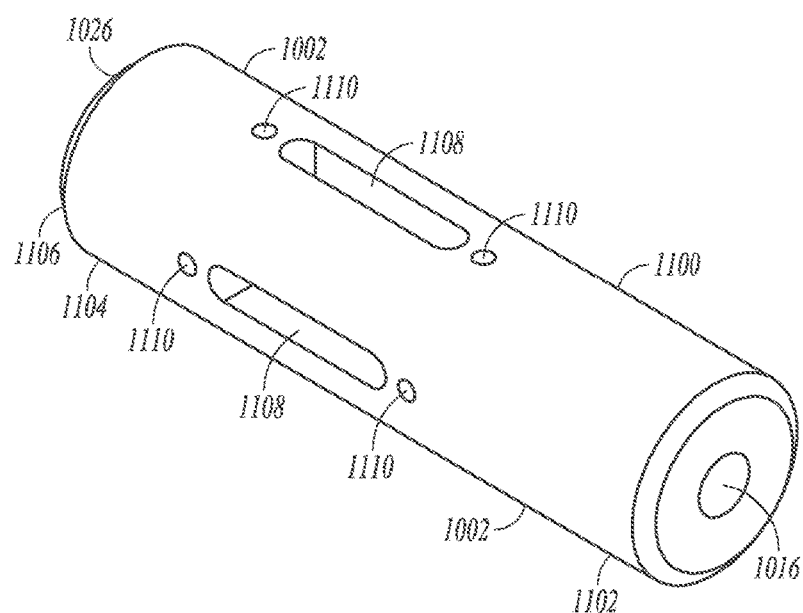
FIG. 11A is a perspective view of another example of a pipe splitting cutter.
Figure 11B:
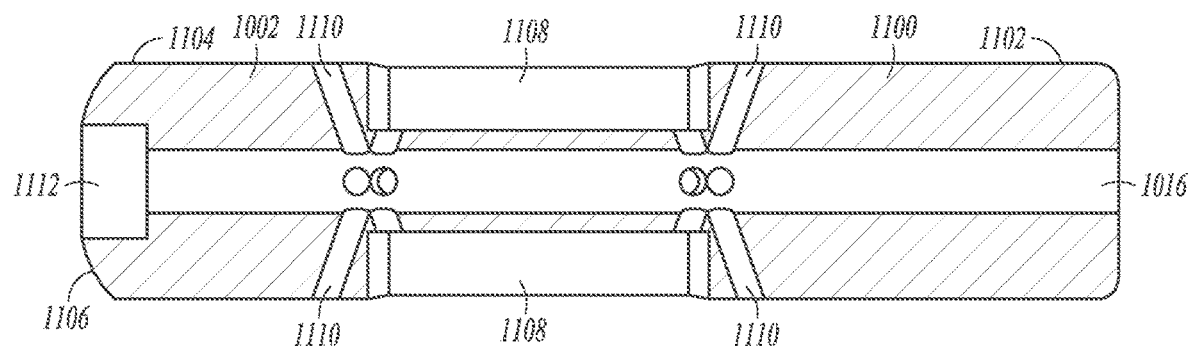
FIG. 11B is a cross-sectional view of the pipe splitting cutter shown in FIG. 11A.

One example of the pipe splitting cutter 1002 is shown in FIGS. 11A and 11B. The cutter 1002 includes a cutter joint surface 1106 at the cutter fitting 1026. As described above with regard to the hammer nose assembly 104, the cutter joint surface 1106 of the cutter fitting 1026 is sized and shaped for reception within a socket 1028 having a corresponding shape to maintain surface to surface contact of the articulated cutter 1002 during rotation the cutter relative to the expander 1006 and the pneumatic hammer 102. As shown in FIG. 11B, the cutter cable lumen 1016 extends through the cutter body 1100 from the cutter proximal end 1102 to the cutter distal end 1104, the cutter cable lumen 1016 forms a portion of the overall composite cable lumen 1012 extending through the hammer nose assembly 1000. In another example, the cutter 1002 includes a jack recess 1112 sized and shaped to receive a portion of the anchor jack 1024. The jack recess 1112 is sized and shaped to provide sufficient room for reception of the portion of the anchor jack 1024 to allow full rotation of the cutter 1002 at the rotatable joint 1004. Stated another way, the jack recess 1112 substantially prevents interference with rotation of the cutter 1002 along the surface of the joint bar socket by the anchor jack 1024.

The cutter 1002 further includes cutter blade recesses 1108 sized and shaped to receive the cutter blades 1014 (see FIG. 10B). As described above, the cutter blades 1014 include a variety of materials, shapes and sizes and are positioned within the cutter blade recesses 1108 to provide a variety of cutting surfaces for engagement and splitting of existing pipes and tubes. Referring to FIGS. 11A, 11B the cutter 1002, in one example, includes tool access recesses 1110 extending from the exterior of the cutter 1002 toward the tool access recesses 1110. The tool access recesses 1110 provide passages that facilitate the insertion of tools into the cutter body 1100. The tools are fed through the tool access recesses 1110 toward the cutter blade recesses 1108. For instance, the tool access recesses 1110 on one side of the cutter body 1100 provide access through the cutter cable lumen 1016 to the cutter blade recesses 1108 on the opposed side of the cutter body 1100. Tools fed through the two access recesses 1110 are engaged against the opposed cutter blades 1014 and push the cutter blades 1014 out of the cutter blade recesses 1108. The cutter blades 1014 are replaced or exchanged with other cutter blades as needed according to the pipe or tubing cut with the hammer nose assembly 1000. In operation, the cutter blades 1014 are positioned within the cutter blade recesses 1108 and fastened therein, for instance, with an interference fit, adhesives, fasteners and the like. When removal of the cutter blades 1014 from the cutter 1002 is desired tools are fed through the tool access recesses 1110 and then engaged with the cutter blades 1014 to force the cutter blades 1014 out of the cutter blade recesses 1108.

Figure 12:
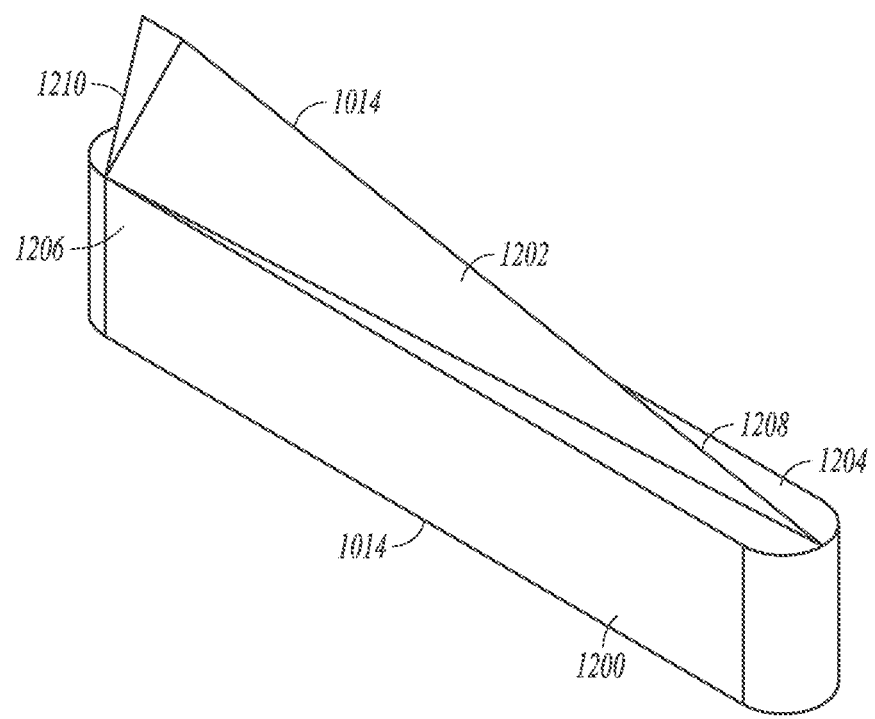
FIG. 12 is a perspective view of one example of a replaceable cutting blade useable with the pipe splitting cutter shown in FIG. 11A.

Referring now to FIG. 12, one example of a cutter blade 1014 is shown. Cutter blade 1014 includes a cutter blade body 1200 coupled with a blade 1202 extending from the cutter blade body. The cutter blade 1014 includes a blade proximal end 1204 extending toward a blade distal end 1206. A blade leading edge 1208 of the blade 1202 tapers from the blade distal end 1206 toward the blade proximal end 1204. As shown in FIG. 12, the blade 1202 further includes a blade trailing edge 1210. The cutter blade recesses 1108 (shown in FIGS. 11A, B) have a corresponding shape to the shape of the cutter blade body 1200. One example of the shape of the cutter blade body 1200 is configured to provide an interference fit with the surfaces defining the cutter blade recesses 1108. In yet another example, the cutter blade body 1200 includes a coupling feature sized and shaped to couple the cutter blade body 1200 with the surfaces defined in the cutter blade recesses 1108. For instance, the coupling features of the cutter blade body 1200 include but are not limited to adhesives, temporary welds, mechanical interfitting surfaces, mechanical fasteners and the like. The cutter blades 1014 are positionable within the cutter 1002 and capable of providing a reliable cutting surface for use in splitting existing pipes and tubes with the hammer nose assembly 1000. Further, the cutter blades 1014 are removable from the cutter body 1100 to allow for placement or exchange of cutter blades 1014 without requiring replacement of the cutter body 1100.

The blade 1202 includes the blade leading edge 1208 and blade trailing edge 1210. Each of these surfaces are optionally are constructed with one of a variety of materials in one or more shapes and dimensions to provide a desired cutting surface for use with the hammer nose assembly 1000. For example, an operator may choose one or multiple blades having a combination of materials, shapes, dimensions, and the like for use a variety of pipes and tubes constructed with differing materials. The hammer nose assembly 1000 including the cutter 1002 is assembled with blades 1202 appropriate to the material of the existing pipe or tube and the hammer nose assembly is driven and pulled through the existing pipe.

Figure 13A:
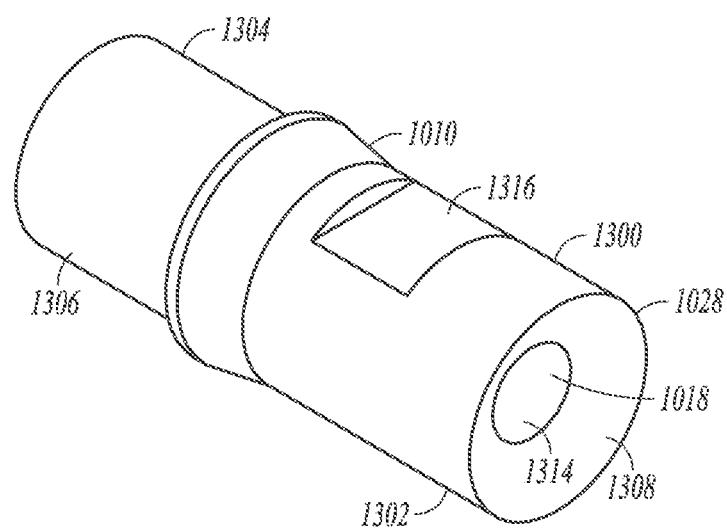
FIG. 13A is a perspective view of another example of a joint bar used in a rotatable joint of a hammer nose assembly.
Figure 13B:
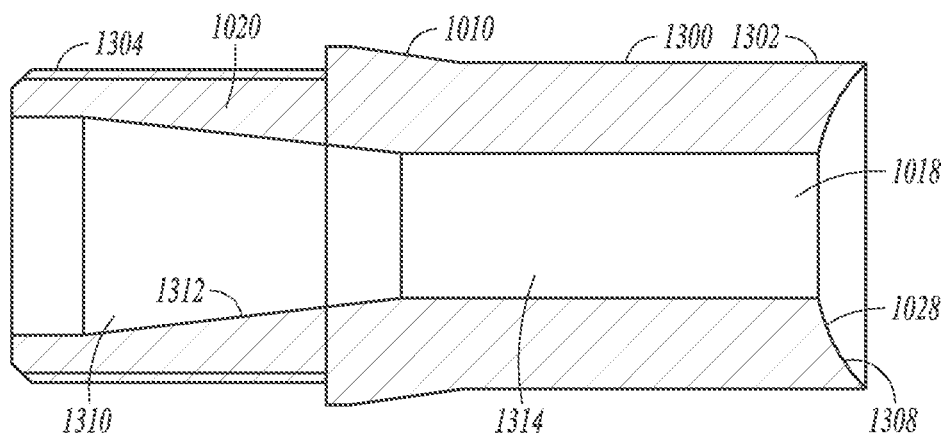
FIG. 13B is a cross-sectional view of the joint bar shown in FIG. 13A.

One example of a joint bar 1010 is shown in FIGS. 13A, B. The joint bar body 1300 extending from a joint bar proximal end 1302 to a joint bar distal end 1304. The joint bar body 1300 further includes an expander coupling 1306 sized and shaped to couple with the expander 1006 shown in FIGS. 10A and 10B. In one example, the expander coupling 1306 includes, but is not limited to, threading, mechanical fitting surfaces, adhesives, welds, fasteners and the like to couple the joint bar body 1300 with the expander 1006. The joint bar socket 1028 is shown in FIGS. 13A and 13B near the joint bar proximal end 1302. As similarly described previously with respect to the rotatable joint 206 of the hammer nose assembly 104, the rotatable joint 1004 of the hammer nose assembly 1000 includes the joint bar socket 1028 having a bar joint surface 1308 sized and shaped to provide continuous surface to surface contact with the cutter joint surface 1106 of the cutter fitting 1026 (See FIGS. 11A and 11B). Continuous surface to surface contact is provided between the bar joint surface 1308 and the cutter joint surface 1106 throughout articulation of the cutter 1002 relative to the joint bar 1010, expander 1006 and pneumatic hammer 102. Stated another way, the joint bar socket 1028 and the cutter fitting 1026 form a ball and socket joint and maintain surface to surface contact during rotation of the cutter 1002 relative to the joint bar and expander 1006. Continuous surface to surface contact between the cutter 1002 and joint bar 1010 ensures pulling forces transmitted to the joint bar 1010 from the cable gripping anchor 1022 are continuously transmitted to the cutter 1002 in any orientation relative to the joint bar 1010. Similarly, continuous surface to surface contact between the cutter 1002 and the joint bar 1010 through the rotatable joint 1004 (e.g., a ball and socket joint) facilitates continuous transmission of dynamic percussive forces from the pneumatic hammer 102 to the cutter blades 1014 of the cutter. The surface to surface contact provides a solid planar interface between the cutter 1002 and the joint bar 1010 and eliminates edge and point contacts between features that could fail under static and dynamic loads caused by pulling and percussive forces. Further, the surface to surface contact ensures that at least a portion of the cutter joint surface 1106 is substantially perpendicular to a longitudinal axis of the pneumatic hammer throughout articulation to receive the entire percussive driving force from the hammer without slipping or deflection between the joint bar socket 1028 and the cutter fitting 1026.

Referring to FIG. 13B, the joint bar 1010 further includes an anchor recess 1310 sized and shaped to receive the cable gripping anchor 1022 (shown in FIG. 10B). The anchor recess 1310 includes a housing tapered surface 1312 having a corresponding shape to the exterior shape of the cable gripping anchor 1022. As described above with regard to the cable gripping anchor 230, engagement of the cable gripping anchor 1022 with the housing tapered surface 1312 compresses the cable gripping anchor inwardly around a cable 1030 extending through the cable gripping anchor thereby forcing the cable gripping anchor to tightly clamp around the cable and immobilize the cable relative to the cable gripping anchor and the cable gripping housing 1020.

The joint bar body 1300 of the joint bar 1010 further includes a jack recess 1314 sized and shaped to receive the anchor jack 1024 shown in FIG. 10B. The jack recess 1314 is co-extensive with the joint cable lumen 1018 as shown in FIG. 13B. The jack recess 1314 is sized and shaped to receive and retain the anchor jack 1024 therein while also allowing passage of a cable through the anchor jack 1024. The jack recess 1314 and anchor jack 1024 are sized to allow for sliding movement of the cable relative to the jack recess and the anchor jack. In one example, the surfaces defining the jack recess 1314, for instance, the inner surfaces of the joint cable lumen 1018 include mechanical interfitting features (e.g., threading) sized and shaped to engage with the anchor jack 1024. Rotation of one of the joint bar 1010 relative to the anchor jack 1024 move the anchor jack proximally or distally. When the anchor jack 1024 is moved distally as described below it engages with the cable gripping anchor 1022 engaged along the housing tapered surface 1312 and breaks the engagement between the anchor and the tapered surface.

Referring now to FIG. 13A, a tool engaging surface 1316 is shown extending along the exterior of the joint bar body 1300. The tool engagement surface 1316 provides a surface for engagement with a tool such as a wrench to facilitate transmission of rotational forces to the joint bar body 1300 to rotate it. For instance, relative to the anchor jack 1024 as described below. Optionally, the tool engagement surface 1316 is used with a tool to hold the joint body 1300 still while the anchor jack 1024 is driven distally into engagement with the cable gripping anchor 1022 to release the anchor around the cable.

Figure 14:
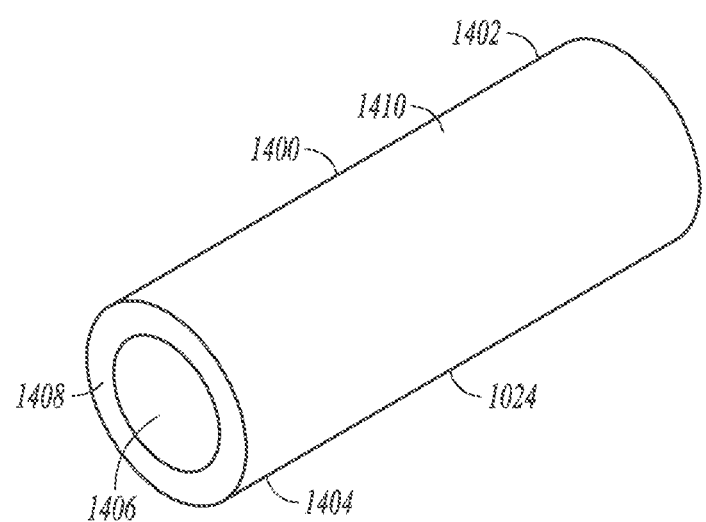
FIG. 14 is a perspective view of one example of an anchor jack.

Referring now to FIG. 14, one example of an anchor jack 1024 is shown. The anchor jack 1024 includes an anchor body 1400 extending between a jack proximal end 1402 and a jack distal end 1404. A jack lumen 1406 extends through the anchor jack 1024 to pass a cable, such as cable 1030 shown in FIG. 10B, through the anchor jack 1044 on its way to the cable gripping anchor 1022. The anchor jack 1024 further includes an anchor engagement feature 1408, such as a distal end face of the jack distal end 1404. The anchor engagement feature 1408 is sized and shaped to engage with a portion of the cable gripping anchor 1024, for instance, the anchor proximal end 802 shown in FIG. 8A. The jack body 1400 further includes a jack coupling feature 1410 extending over at least a portion of the jack body. As described above, the interior surface of the joint bar 1010 defining the jack recess 1314 includes corresponding features. Engagement of the jack coupling feature 1410 along the features of the joint bar 1010 provides a mechanical interfit between the joint bar and the anchor jack, and movement including rotation of one of the joint bar 1010 relative to the anchor jack 1024 moves the anchor jack proximally or distally within the jack recess 1314. Optionally, the anchor jack 1024 is slidably received in the jack recess 1314, and longitudinal movement of the anchor jack (e.g., the anchor jack is struck by a tool) drives the anchor jack through the jack recess 1314 toward the cable gripping anchor 1024.

In operation, the hammer nose assembly 1000 is used, at least in some respect, similarly to the hammer nose assembly 104 shown in FIG. 1. Referring to FIGS. 10A and 10B, compressive pulling forces transmitted from the cable 1030 to the cable gripping anchor 1022 and cable gripping housing 1020 are transmitted through the rotatable joint 1004 or the joint bar 1010 into the cutter 1002. As described above, the surface to surface contact between the cutter fitting 1026 and joint bar socket 1028 ensures surface to surface contact between the cutter 1002 and the joint bar 1010 throughout rotation (e.g., articulation) of the cutter relative to the joint bar, expander 1006 and pneumatic hammer 102. Similarly, the continuous surface to surface contact between the cutter fitting 1026 and joint bar socket 1028 of the rotational joint 1004 continuously transmits dynamic percussive forces from the pneumatic hammer 102 through the expander 1006, joint bar 1010 and into the cutter 1002. The combination of compressive pulling forces and dynamic percussive forces drives the cutter blades 1014 into engagement and splits existing pipes and tubes. The surface to surface contact provides a solid planar interface between the cutter 1002 and the joint bar 1010 and eliminates edge and point contacts between features that could fail under static and dynamic loads caused by pulling and percussive forces.

The hammer nose assembly 1000 further provides a guide function to the pneumatic hammer 102 by guiding the pneumatic hammer through non-linear pipes including elbows, kinks, bends and the like. Guidance provided by the hammer nose assembly 1000 ensures that the pneumatic hammer continues to drive the hammer nose assembly through these non-linear portions of the existing pipe and also prevents wandering of the pneumatic hammer 102 out of the existing pipe. Lodging of the pneumatic hammer 102 within surrounding soil and rock is thereby avoided.

When disassembly of the hammer nose assembly 1000 is desired the cutter blade 1002 is slid down the cable 1030 proximally away from the joint bar 1010. Optionally, the joint bar 1010 is disengaged from the expander 1006. For instance, where the joint bar 1010 is threaded onto the expander 1006 rotation of the joint bar 1010 relative to the expander 1006 disengages the joint bar. To disengage the cable gripping anchor 1022 from the cable gripping housing 1020 the anchor jack 1024 is moved distally into engagement with the cable gripping anchor 1022 to force the cable gripping anchor out of engagement with the housing tapered surface 1312 shown in FIG. 13B. As shown in FIG. 10B, the anchor jack 1024 extends proximally relative to the most distal portion of the bar joint surface 1308 (see FIGS. 13A, 13B). The proximal portion of the anchor jack 1024 is engaged, for instance, with a tool while the tool engagement surface 1316 of the joint bar body 1300 is engaged with another tool to hold the joint bar body still. Rotation of the anchor jack 1024 relative to the joint bar 1010 moves the anchor jack 1024 distally into engagement with the cable gripping anchor 1022 (i.e., where the anchor jack is threaded with the joint bar 1010). Further movement of the anchor jack 1024 distally forces the anchor jack 1024 out of engagement with the housing taper surface 1312 shown in FIG. 13B. Disengagement of the cable gripping anchor 1022 from the housing tapered surface 1312 of the cable gripping housing 1020 correspondingly disengages the cable gripping anchor from the cable 1030. The cable 1030 is thereafter free to slide relative to the joint bar 1010 and cable gripping anchor 1022. The cable gripping anchor 1022 and joint bar 1010 and cutter 1002 are slid off the cable 1030 allowing for disassembly of the hammer nose assembly 1000 from the cable 1030. Optionally, where the anchor jack 1024 is at least distally slidable within the joint bar 1010, the anchor jack 1024 is struck with a tool to drive the anchor jack 1024 into engagement with the cable gripping anchor 1022. The anchor jack 1024 forces the anchor 1022 out of engagement with the cable gripping housing 1020.

Figure 15A:
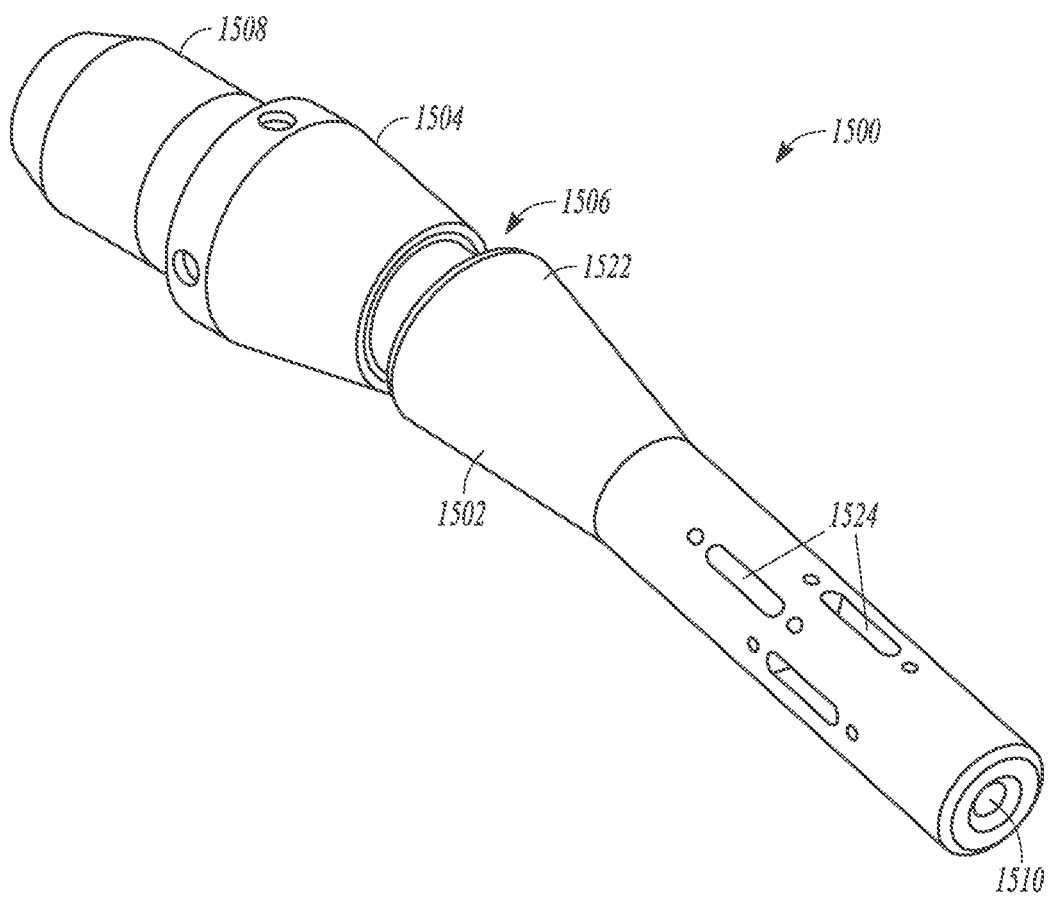
FIG. 15A is a perspective view of yet another example of a hammer nose assembly in an articulated orientation.
Figure 15B:
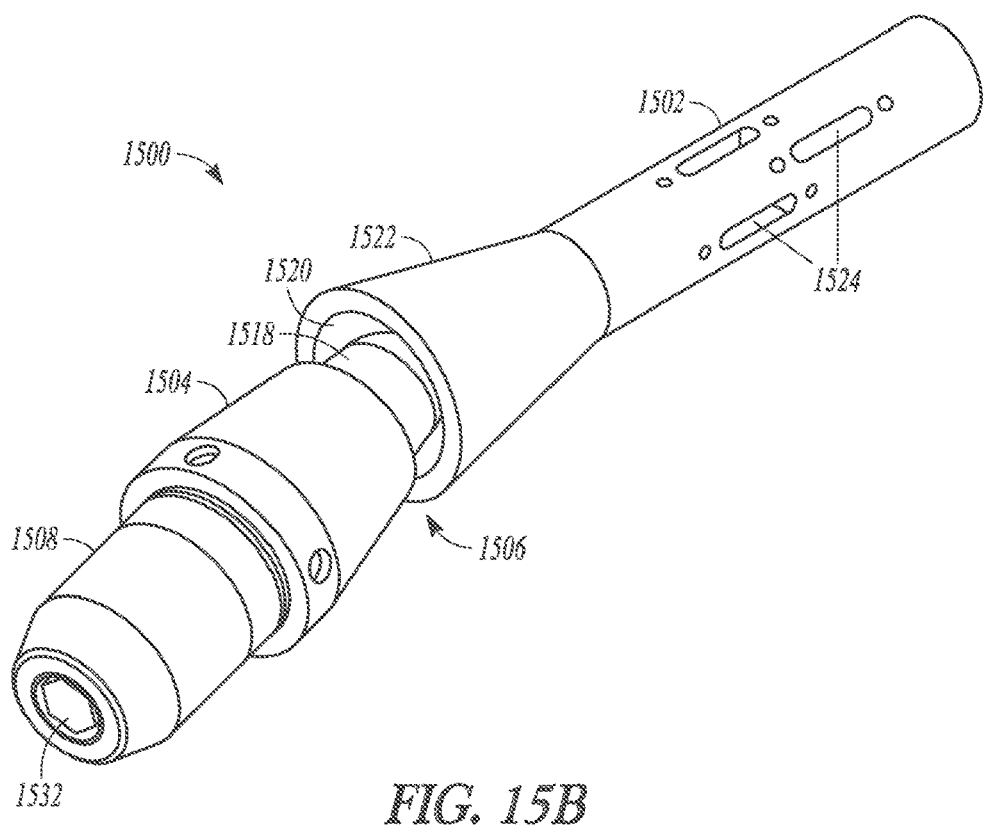
FIG. 15B is a perspective view of the rear of the hammer nose assembly shown in FIG. 15A.

Another example of a hammer nose assembly 1500 is shown in FIGS. 15A through 15B. The hammer nose assembly 1500 is similar in at least some respects to the hammer nose assemblies shown in FIGS. 1 through 14. For instance, the hammer nose assembly 1500 includes a cutter 1502 coupled with an expander 1504 by way of a rotatable joint 1506. The cutter 1502 includes cutter blade recesses 1524 sized and shaped to receive one of a variety of cutter blades. As previously described with regard to the cutter blades 1014, any of a plurality of cutting blades having different shapes, materials, sizes and the like are positionable within the cutter blade recesses 1524 to provide a plurality of cutting surfaces and characteristics for use with a corresponding variety of existing pipes. As shown in FIGS. 15A and 15B, the expander 1504 includes a hammer coupling 1508 sized and shaped for engagement in coupling with a pneumatic hammer such as pneumatic hammer 102 shown in FIG. 1. A cable lumen 1510 extends through the hammer nose assembly 1500. For instance, the cable lumen 1510 extends through the cutter 1502 and expander 1504. The cable lumen 1510 allows a cable to be fed through the hammer nose assembly 1500 to a cable gripping anchor, such as the cable gripping anchor 1526, described below. Referring to FIG. 15B, the cable lumen 1510 is a composite lumen including a cutter cable lumen 1512 extending through the cutter 1502 and an expander cable lumen 1514 extending through the expander 1504. In one example, an anchor cable lumen 1516 extends through the cable gripping anchor 1526.

As similarly described in regard to the hammer nose assemblies 104, 1000, the composite cable lumen 1510 allows passage of cable through the hammer nose assembly 1500. When engaged with the cable gripping anchor 1526 the cable acts as a fastener between the components of the hammer nose assembly including the cutter 1502 and the expander 1504. The cutter 1502 is thereby able to rotate relative to the expander 1504 while remaining in contact with the expander. Stated another way, when the hammer nose assembly 1500 is assembled along the cable the hammer nose assembly is able to articulate with the cable, for instance, as the cable is drawn through an existing pipe having non-linear piping including elbows, bends, kinks and the like. As the cable deflects through the non-linear piping the hammer nose assembly 1500 articulates with the cable around the rotatable joint 1506.

Figure 15C:
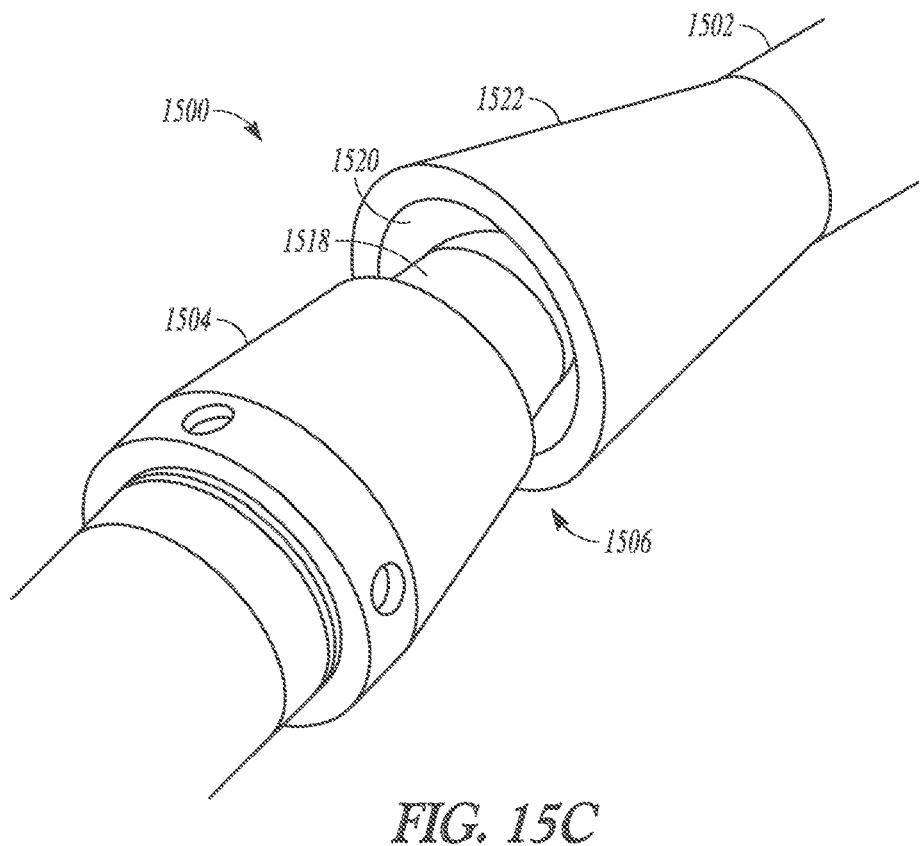
FIG. 15C is a detailed perspective view of the rotatable joint of the hammer nose assembly shown in FIG. 15A.
Figure 15D:
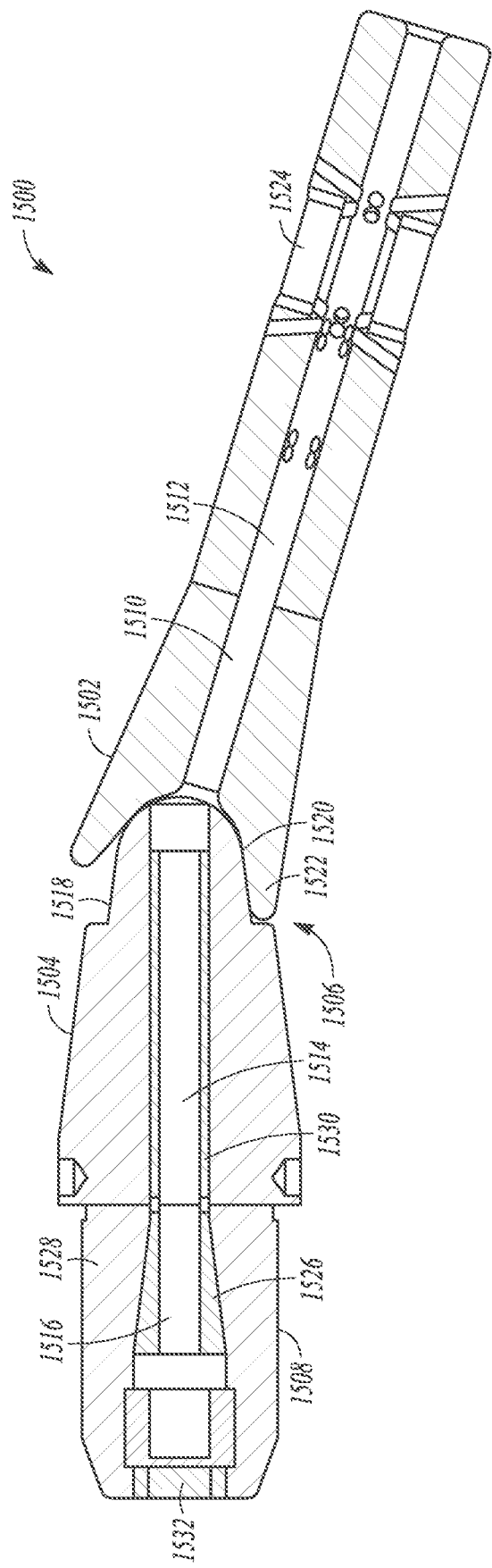
FIG. 15D is a cross-sectional view of the hammer nose assembly shown in FIG. 15A.

As shown in FIGS. 15B and 15D, the hammer nose assembly 1500 further includes a retaining nut 1532 sized and shaped for coupling within the hammer coupling 1508. The retaining nut 1532 fills a recess within the hammer coupling 1508 used for assembly of the cable gripping anchor 1526 on the cable prior to coupling within a cable gripping housing 1528. The retaining nut 1532 closes the recess containing the cable gripping anchor 1526 and substantially prevents removal of the cable gripping anchor from the hammer nose assembly 1500 until disassembly at the hammer nose assembly is desired.

Referring now to FIGS. 15C and 15D, a detailed example of the rotatable joint 1506 is shown. The expander 1504 includes an expander fitting 1518 sized and shaped for reception within a cutter socket 1520 of the cutter 1502. The surfaces of the cutter socket 1520 and expander fitting 1518 are sized and shaped to provide continuous surface to surface contact during articulation of the cutter 1502 relative to the expander 1504 and pneumatic hammer 102. Stated another way, the surfaces of the cutter socket 1520 and the expander fitting 1518 form a ball and socket joint permitting articulation of the cutter 1502 relative to the expander 1504 and transmission of pulling forces and dynamic percussive forces through the rotatable joint 1506 throughout rotation of the cutter 1502 relative to the expander 1504. The cutter 1502 includes a joint skirt 1522 extending around the rotatable joint 1506. As will be described in further detail below, the joint skirt 1522 conceals and isolates the rotatable joint 1506 from materials surrounding the hammer nose assembly 1500 including existing piping and surrounding soil and rock.

Referring now to FIG. 15D, a cable gripping anchor 1526 is shown an engaged orientation with the cable gripping housing 1528. In one option, the cable gripping housing 1528 and cable gripping anchor 1526 are housed within the hammer coupling 1508. In another option, the cable gripping anchor 1526 and the cable gripping housing 1528 are positioned anywhere within the expander 1504 distal to the rotatable joint 1506. As previously described with regard to the hammer nose assemblies 104, 1000, the cable gripping anchor 1526 is sized and shaped to engage around the cable. Proximal movement of the cable gripping anchor with the cable therein and relative to the cable gripping housing 1528 engages the exterior tapered surfaces of the cable gripping anchor 1526 with the corresponding tapered surfaces of the cable gripping housing 1528. Engagement between the two surfaces compresses the cable gripping anchor 1526 inwardly around the cable and clamps the cable gripping anchor onto the cable. Similarly, the cable gripping anchor 1526 is engaged between the cable and the cable gripping housing 1528 and locked therein. The cooperative engagement between these surfaces of the cable gripping anchor 1526 and cable gripping housing 1528 as well as the engagement of the cable gripping anchor 1526 with the cable locks the anchor relative to the cable gripping housing and substantially prevents relative longitudinal movement between the cable and the hammer nose assembly 1500. Pulling forces transmitted through the cable are thereby transmitted into the hammer nose assembly 1500 drawing the hammer nose assembly through an existing pipe and forcing the cutting blades to split apart the pipe.

Optionally, the hammer nose assembly 1500 further includes an anchor jack 1530 sized and shaped for engagement with the cable gripping anchor 1526 to disengage the cable gripping anchor 1526 from the cable gripping housing 1528. When disengagement of the anchor 1526 from the housing 1528 is desired a tool such as a hammer with a pin sized and shaped to engage with the anchor jack 1530 is inserted into the expander cable lumen 1514 and engaged with the anchor jack 1530. Striking of the anchor jack 1530 with such a tool drives the anchor jack distally into engagement with the cable gripping anchor 1526 and forces the cable gripping anchor out of engagement with the cable gripping housing 1528. Disengagement of the cable gripping anchor 1526 from the cable gripping housing 1529 releases the cable held within the cable gripping anchor and allows movement of the cable relative to the hammer nose assembly 1500.

Figure 16A:
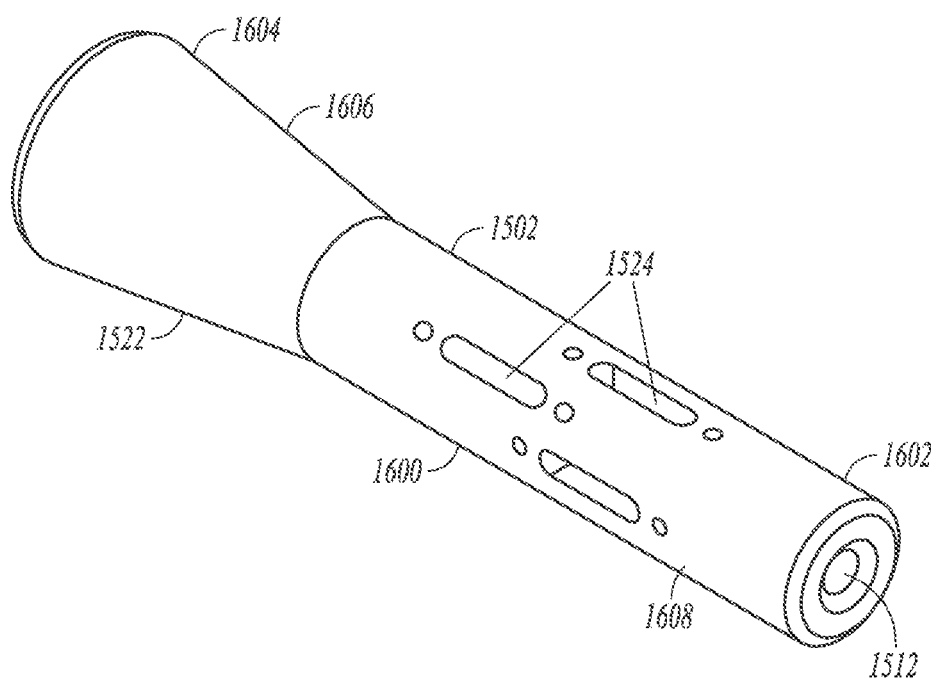
FIG. 16A is a perspective view of the side of yet another example of a pipe splitting cutter.
Figure 16B:
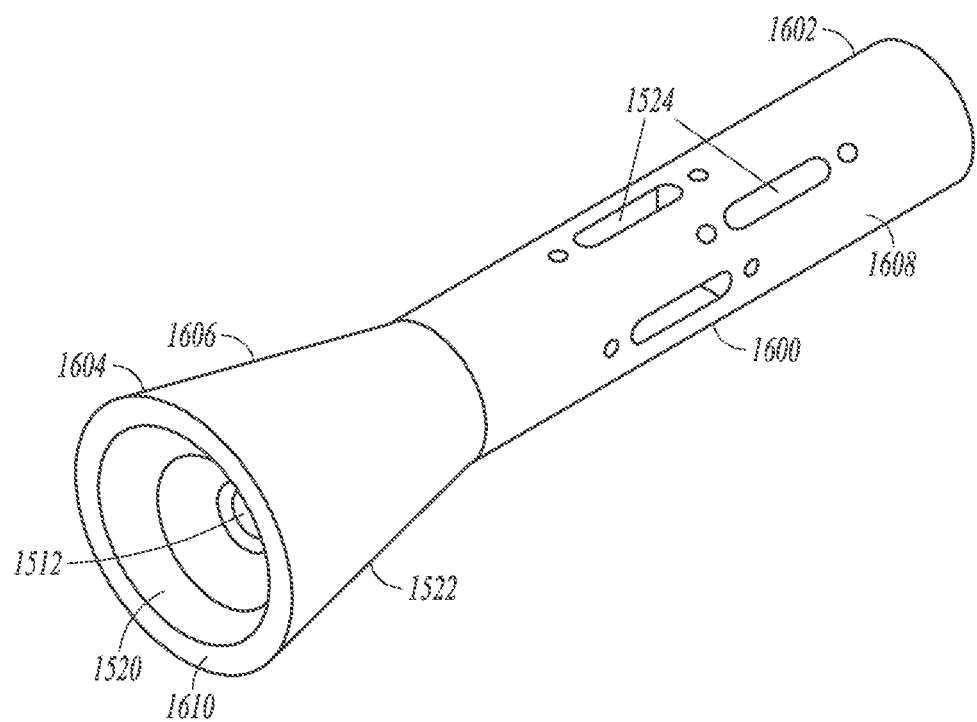
FIG. 16B is a perspective view of the rear of the pipe splitting cutter shown in FIG. 16A.
Figure 16C:
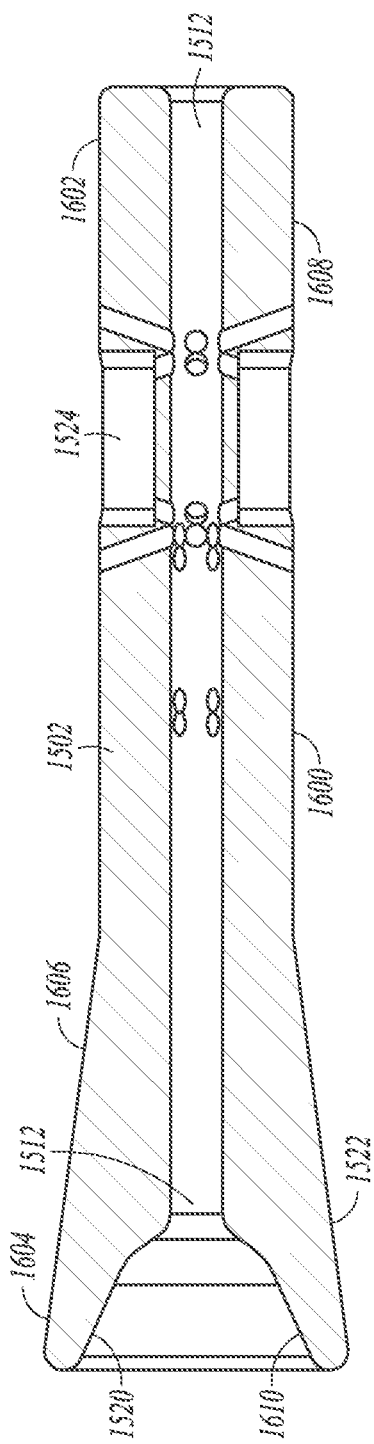
FIG. 16C is a cross-sectional view of the pipe splitting cutter shown in FIG. 16A.

Referring now to FIG. 16A through 16C, one example of the cutter 1502 is shown. The cutter 1502 includes a cutter body 1600 extending from a cutter proximal end 1602 to a cutter distal end 1604. The cutter body 1600 includes a cutter barrel 1608. The cutter barrel 1608 is sized and shaped to include the cutter blade recesses 1524. The cutter blade recesses 1524 as previously described and configured to receive cutter blades such as cutter blades 1014 shown in FIGS. 10A and B. The cutter body 1600 further includes a cutter expander 1606 leading into the joint skirt 1522 adjacent to the cutter distal end 1604. The cutter expander 1606 is sized and shaped to cooperate with the expander 1504 and assist in expanding split existing pipe away from the hammer nose assembly 1500 as the assembly is pulled and driven through the existing pipe. As described above, the cutter cable lumen 1512 of the composite cable lumen 1510 extends through the cutter 1502 and communicates with the expander cable lumen 1514 and anchor cable lumen 1516 shown in FIG. 15D.

Referring to FIGS. 15C, 15D and FIGS. 16B, D, the cutter 1502 includes a cutter socket 1520 bounded by the joint skirt 1522. As described above, the cutter socket 1520 includes a surface sized and shaped to engage in surface to surface contact with an expander fitting 1518 of the expander 1504. One example of a cutter socket surface 1610 is shown in FIGS. 16B and 16C. The cutter socket surface 1610 has a corresponding shape to the rounded surface of the expander fitting 1518. The corresponding shape of the cutter socket surface 1610 allows the cutter 1502 to remain in surface to surface contact with the expander throughout articulation of the cutter relative to the expander 1504 and pneumatic hammer 102. Continuous surface to surface contact of the cutter 1502 with the expander 1504 permits transmission of compressive pulling forces from the expander into the cutter 1502 and transmission of dynamic percussive forces from the pneumatic hammer through the expander and into the cutter. These forces are transmitted into the cutter 1502 in substantially any articulated orientation relative to the expander 1504 and pneumatic hammer 102 where the cutter socket surface 1610 remains in surface to surface contact with the surfaces of the expander fitting 1518.

Referring now to FIGS. 16B and 16C, the joint skirt 1522 extends around the cutter socket surface 1610 as described above. The joint skirt 1522 is sized and shaped to extend over the rotatable joint 1506 shown in FIGS. 15A through 15C. Concealment of the rotatable joint 1506 by the joint skirt 1522 substantially isolates the rotatable joint including the cutter socket surface 1610 of the cutter socket 1520 and the expander fitting 1518. Isolation of the rotatable joint 1506 in this manner assists in preventing particulate matter such as rock, soil and the like from infiltrating the rotatable joint 1506 and interfering with the smooth articulation of the cutter 1502. Additionally, the joint skirt 1522 increases the depth of the cutter socket 1520 to ensure the expander fitting 1518 remains in engagement with the cutter socket surface 1610 during articulation of the cutter 1502 relative to the expander 1504. Stated another way, the joint skirt 1522 extends distally from the trough of the cutter socket 1520 to provid a deeper pocket for reception of the expander fitting 1518. When the cutter 1502 is under compression from pulling forces transmitted from the expander 1504 into the cutter the joint skirt 1522 affirmatively retains the expander fitting 1518 within the cutter socket 1520.

Figure 17A:
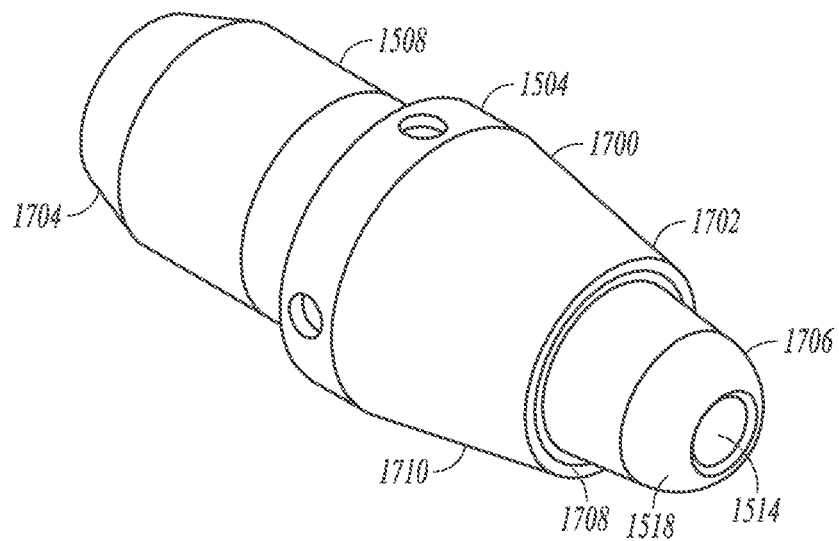
FIG. 17A is a perspective view of the side yet another example of a cable coupling including an expander.
Figure 17B:
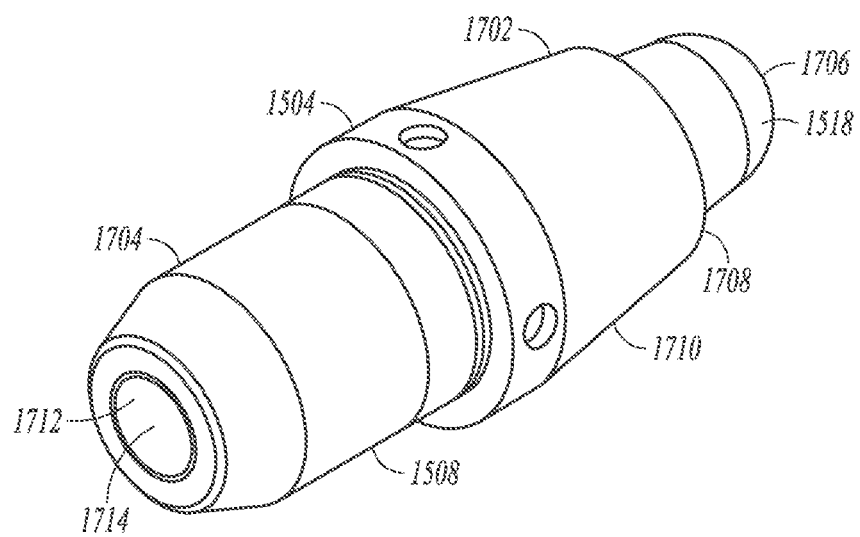
FIG. 17B is another perspective view of the side of the cable coupling shown in FIG. 17A.

Another example of the expander 1504 is shown in FIGS. 17A and 17B. Referring first to FIGS. 15A through 15D, the expander 1504 is sized and shaped to couple with the cutter 1502 through the rotatable joint 1506. Additionally, the expander 1504 includes the hammer coupling 1508 sized and shaped to couple with the pneumatic hammer 102. The expander 1504 acts as an intermediate link between the cutter 1502 and the pneumatic hammer 102 and facilitates rotation of the cutter 1502 through the rotatable joint 1506. Referring now to FIGS. 17A and 17B, the expander 1504 includes an expander body 1700 extending between an expander proximal end 1702 and an expander distal end 1704. The expander 1504 includes an expander tapered surface 1710 extending from an intermediate portion of the expander 1504 toward the expander proximal end 1702. The expander tapered surface 1710 tapers from the intermediate portion of the expander toward the expander proximal end 1702. The expander tapered surface 1710 cooperates with the cutter expander 1606 on the cutter 1502 to push split existing pipe away from the hammer nose assembly 1500 after it is cut apart with the cutter blades retained within the cutter blade recesses 1524 (See FIG. 15B).

The hammer coupler 1508 extends from near the expander distal end 1704 toward an intermediate portion of the expander 1505. As shown in FIG. 17B, an anchor recess 1712 extends into the hammer coupling 1508. The anchor recess 1712 is sized and shaped to receive the retaining nut 1532 shown in FIG. 15D. Optionally, the interior surface of the hammer coupling 1508 circumscribing the anchor recess 1712 includes an expander coupling feature 1714 (e.g., threading, adhesives, fasteners and the like) sized and shaped to engage with the retaining nut 1532 and retain the nut within the anchor recess 1712 after positioning of the cable gripping anchor 1526 therein.

As previously described, the expander 1504 includes an expander fitting 1518 sized and shaped to engage with the cutter socket 1520 of the cutter 1502. In one example, the expander fitting 1518 acts as the ball within the socket of the cutter socket 1520 and forms a ball and socket joint as the rotatable joint 1506 between the expander 1504 and cutter 1502. The expander fitting 1518 includes an expander fitting surface 1706 sized and shaped to engage in surface to surface contact with the cutter socket surface 1610 (see FIGS. 16A through 16C) throughout articulation of the cutter 1502 relative to the expander 1504 and the pneumatic hammer 102. For example, the expander fitting surface 1706 has a shape corresponding to the cutter socket surface 1610. The corresponding shapes of the surfaces 1610, 1706 ensures the cutter 1502 remains in surface to surface contact with the expander 1504 at the rotatable joint 1506 throughout rotation of the cutter. Stated another way, the continuous surface to surface contact of the rotatable joint 1506 ensures compressive forces are continuously transmitted from the expander 1504 to the cutter 1502 during any articulation of the cutter relative to the expander 1504. In a similar manner, the continuous surface to surface contact between the cutter socket surface 1610 and expander fitting surface 1706 insures dynamic percussive forces transmitted from the pneumatic hammer 102 into the expander 1504 are similarly continuously transmitted into the cutter 1502 where the cutter 1502 is in substantially any orientation relative to the expander 1504.

Optionally, the expander body 1700 further includes a skirt recess 1708 extending around the expander fitting 1518. The skirt recess 1708 is sized and shaped to receive a distal edge of the joint skirt 1522 as shown in FIGS. 15A-D. As the cutter 1502 rotates relative to the expander 1504, the joint skirt 1522 extending around the rotatable joint 1506 is received within the skirt recess 1708 as the cutter 1502 reaches the maximum allowable articulation of the cutter relative to the expander. The skirt recess 1708 thereby allows for additional articulation of the cutter 1502 relative to the expander 1504 without the provision of a smaller expander 1504 or removal of the joint skirt 1522 from the cutter 1502.

Figure 18:
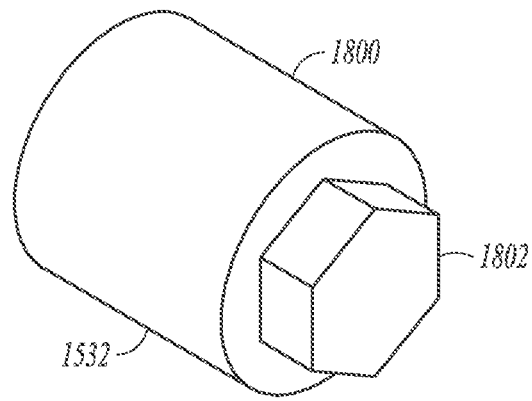
FIG. 18 is a perspective view of one example of a retaining nut.

Referring now to FIG. 18, one example of a retaining nut 1532 is shown. The retaining nut 1532 includes a nut coupling feature 1800 sized and shaped to engage with the expander coupling feature 1714 shown in FIG. 17B. In one example, the expander coupling feature 1714 and nut coupling feature 1800 include but are not limited to threading, mechanical interfitting features, mechanical fasteners, adhesives, welds, and the like. When the retaining nut 1532 is positioned within the anchor recess 1712 of the expander 1504 the retaining nut 1532 substantially closes the anchor recess 1712 and retains the cable gripping anchor 1526 (FIG. 15D) within the anchor recess 1712. The retaining nut 1532 thereby substantially prevents unexpected disassembly of the hammer nose assembly 1500 prior to or during use of the hammer nose assembly. Optionally, the retaining nut 1532 includes a tool engagement feature 1802. In one example, the tool engagement feature 1802 includes a hexagonal surface sized and shaped for engagement with a tool such as a wrench to rotate the retaining nut 1532 out of the anchor recess 1712.

In operation the hammer nose assembly 1500 is coupled with a pneumatic hammer, such as pneumatic hammer 102 shown in FIG. 1. Additionally, a cable 1030 (FIG. 10B) is threaded through the cable lumen 1510 extending through the cutter 1502, expander 1504 and into the cable gripping anchor 1526. The cable is grasped by the cable gripping anchor 1526 and anchored therein according to the locking engagement between the anchor and cable gripping housing 1528. Pulling forces transmitted from the cable to the cable gripping anchor 1526 are transmitted through the expander 1504 and into the cutter 1502 by way of the rotatable joint 1506. Similarly, dynamic percussive forces are transmitted from the pneumatic hammer 102 through the hammer coupling 1508 and into the expander 1504. The percussive forces are transmitted from the expander 1504 through the rotatable joint 1506 into the cutter 1502. The dynamic percussive forces and compressive pulling forces transmitted into the cutter 1502 drive the cutting blades of the cutter 1502 into engagement with an existing pipe and split the existing pipe. The hammer nose assembly 1500 and the pneumatic hammer 102 navigate through the existing pipe and continue to split the pipe with pulling and percussive forces. Optionally, the hammer nose assembly 1500 and the pneumatic hammer 102 are part of a pipe splitting assembly 100 including a replacement pipe 108. Operation of the pipe splitting assembly 100 not only splits the existing pipe and pushes it into the surrounding soil and rock it also pulls the replacement pipe 108 into the space originally occupied by the existing pipe and positions the replacement pipe therein.

The rotatable joint 1506 of the hammer nose assembly 1500 allows the cutter 1502 to articulate relative to the expander 1504 and the pneumatic hammer 102. The hammer nose assembly 1500 is thereby able to traverse non-linear piping and tubing including elbows, curves, kinks, bends and the like. Additionally, the articulating hammer nose assembly 1500 is configured to traverse inherently non-linear tubing and piping unrolled from a spool and buried within the ground. The piping or tubing rolled off of the spool includes at least some non-linear portions corresponding to the shape of the spool. The hammer nose assembly 1500 is able to traverse and navigate through non-linear piping and tubing according to rotation of the cutter 1502 through the rotatable joint 1506. As previously described, when the hammer nose assembly 1500 encounters a non-linear portion of the pipe or tubing the cutter 1502 articulates relative to the expander 1504 and the pneumatic hammer 102. Articulation of the cutter 1502 allows the cutter to navigate through the non-linear portions of the pipe or tubing while also guiding the expander 1504 and pneumatic hammer behind it.

Compressive forces are transmitted by pulling of a cable, such as cable 1030 shown in FIG. 10B, to the expander 1504. The compressive forces are transmitted through the rotatable joint 1506 to the cutter 1502 by surface to surface contact between the cutter socket 1520 and expander fitting 1518. This continuous surface to surface contact between the cutter socket 1520 and the expander fitting 1518 continuously transmits compressive pulling forces to the cutter blades of the cutter 1502 for splitting of an existing pipe. In a similar manner, the continuous surface to surface contact between the cutter socket 1520 and the expander 1518 during articulation of the cutter 1502 continuously transmits the dynamic percussive forces from the pneumatic hammer 102 through the expander 1504 and into the cutter 1502.

The dynamic percussive forces drive the cutter blades of the cutter 1502 through the existing pipe including portions having non-linear lengths. The pneumatic hammer 102 cooperates with the articulating hammer nose assembly and transmits percussive forces to the cutter while it is articulated within the non-linear portions. Stated another way, the hammer nose assembly 1500 including the rotatable joint 1506 guides the pipe splitting assembly 100 through non-linear portions of an existing pipe as the hammer nose assembly is drawn through the non-linear portions of the pipe by pulling forces transmitted through a cable. The hammer nose assembly 1500 is driven through the non-linear portions of the existing pipe by the percussive forces provided by the pneumatic hammer. The hammer nose assembly 1500 thereby provides a cutter 1502 capable of articulating relative to the pneumatic hammer 102 while also capable of receiving dynamic percussive forces from the pneumatic hammer and compressive pulling forces from the cable gripping anchor 1526. These compressive pulling forces and dynamic percussive forces are used by the cutter 1502 in substantially any articulated orientation relative to the expander 1504 and pneumatic hammer 102 to drive the cutter 1502 through the existing pipe and split the existing pipe.

The hammer nose assembly 1500 provides a further unexpected benefit by guiding the pneumatic hammer 102 through non-linear portions of the existing pipe and substantially preventing wandering of the pneumatic hammer from the course of the existing pipe. Further, because the hammer nose assembly 1500 minimizes wandering of the pneumatic hammer, lodging of the pneumatic hammer within surrounding soil and rock is also substantially prevented. The articulating hammer nose assembly 1500 thereby guides the pneumatic hammer 102 into and through the non-linear portions of the tubing or piping. At the same time, the hammer nose assembly 1500 transmits compressive and dynamic percussive forces into a cutter 1502 rotated at an angle to the expander 1504 and the pneumatic hammer 102.

Additionally, as shown in FIGS. 15A, 15B, 15C and 15D, the cutter 1302 includes a joint skirt 1522 extending around the rotatable joint 1506. As the cutter 1502 navigates piping and tubing, including piping and tubing having non-linear portions, the joint skirt 1522 substantially isolates the rotatable joint 1506 from interaction with surrounding particulate matter within the existing pipe as it is split apart and pushed into the surrounding soil and rock. Isolation of the rotatable joint 1506 maximizes continuous surface to surface contact between the cutter socket 1520 and expander fitting 1518. Maintenance of this continuous contact between the fitting and socket 1518, 1520 ensures consistent reliable transmission of compressive pulling forces and dynamic percussive forces into the cutter 1502 from the expander 1504. Conversely, point to point contact and wear at the fitting and socket 1518, 1520 from particulate matter is minimized.

The hammer nose assembly 1500 is assembled along a cable, such as cable 1030 shown in FIG. 10B. The cutter 1502 is fed proximally over the cable toward, for instance, a wench, spool or the like sized and shaped to draw a cable through an existing pipe. The expander 1504, including the hammer coupling 1508, is then positioned on the cable distal to the cutter 1502. The cable gripping anchor 1526 is thereafter fed onto the cable and positioned within the anchor recess 1712 shown in FIG. 17B. In one example, a retaining nut 1532 shown in FIGS. 15D, 18 is positioned within the anchor recess 1712. Positioning of the retaining nut 1532 within the anchor recess 1712 substantially prevents unintended disassembly of the hammer nose assembly 1500 from the cable prior to or during use of the pipe splitting assembly 100.

A pneumatic hammer 102 (FIG. 1) is coupled with the hammer coupling 1508. Optionally, a pipe holding assembly, such as pipe holding assembly 106 and replacement pipe 108 shown in FIG. 1, is coupled with the pneumatic hammer 102. The hammer nose assembly and the pneumatic hammer 102 are then ready for operation. For example, the pipe splitting assembly 100 including the hammer nose assembly 1500 and pneumatic hammer 102 are pulled through an existing pipe by way of a spool or a wench located on an opposing side at the existing pipe. The pneumatic hammer 102 drives the hammer nose assembly 1500 through the existing pipe as discussed above.

After operation of the pipe splitting assembly 100 when disassembly of the hammer nose assembly 1500 is desired, the pneumatic hammer 102 is decoupled from the hammer coupling 1508. The retaining nut 1532 is removed from the anchor recess 1712 exposing the cable gripping anchor 1526. The cable gripping anchor 1526 is still coupled with the cable gripping housing 1528 within the hammer coupling 1508. In one example, the cable gripping anchor 1526 is in tight locking engagement with the gripping housing 1528. To decouple the cable gripping anchor 1526 the cutter 1502 is proximally slid along the cable away from the expander 1504. The anchor jack 1530 is partially exposed through the expander cable lumen 1514. A tool including an engagement feature sized and shaped to engage with the proximal end of the anchor jack 1530 is fed into the expander cable lumen 1514 and engaged against the anchor jack 1530. Proximal movement of the tool, such as tapping, engages the tool against the anchor jack 1530 and drives it into engagement with the cable gripping anchor 1526. Striking of the cable gripping anchor 1526 by the anchor jack 1530 pushes the cable gripping anchor 1526 out of engagement with the cable gripping housing 1528. The cable gripping anchor 1526 releases the cable after disengagement from the cable gripping housing 1528. After release of the cable gripping anchor from around the cable the anchor is free to slide off of the cable followed by the expander 1504 and the cutter 1502.

Figure 19:
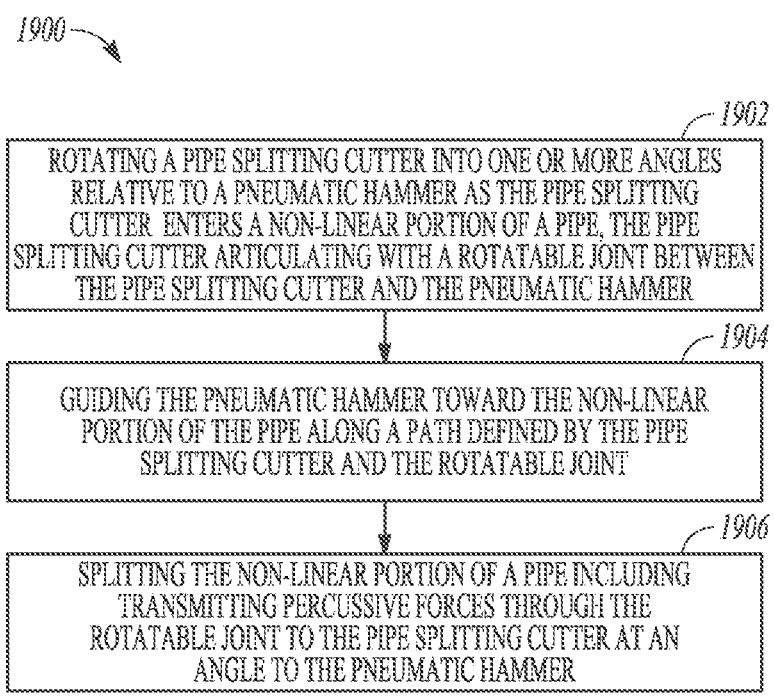
FIG. 19 is a block diagram showing one example of a method for using a pipe splitting assembly.

FIG. 19 shows one example of the method 1900 for using a pipe splitter assembly such as the pipe splitting assembly 100 shown in FIG. 1. Reference is made to various components in the pipe splitting assembly 100 including the hammer nose assembly 104. These references are not intended to be limiting but instead include corresponding and similar elements from other example hammer nose assembly shown herein as well as their equivalents.

At 1902, a pipe splitting cutter 200 is rotated into one or more angles relative to a pneumatic hammer 102. The pipe splitting cutter 200 is rotated relative to the pneumatic hammer 102 as the pipe splitting cutter 200 enters a non-linear portion of a pipe. The pipe splitting cutter 200 articulates with a rotatable joint 206 between the pipe splitting cutter and the pneumatic hammer 102. At 1904, the pneumatic hammer 102 is guided toward and through the non-linear portion of the existing pipe along a path defined by the pipe splitting cutter 200 and the rotatable joint 206 of the hammer nose assembly 104. At 1906, the method 1900 includes splitting the non-linear portion of the pipe including transmitting percussive forces from the pneumatic hammer 102 through the rotatable joint 206 to the pipe splitting cutter 200 at an angle to the hammer.

Optionally, rotating the pipe splitting cutter 200 into one or more angles relative to the pneumatic hammer 102 includes rotating a fitting 220, 224 relative to a socket 222, 226 in the rotatable joint 206. The fittings are in surface to surface contact with the corresponding socket surfaces throughout rotation of the hammer nose assembly 104. Additionally, guiding of the pneumatic hammer toward and through the non-linear portions of the pipe includes substantially preventing wandering of the pneumatic hammer away from the pipe. Stated another way, articulating the pipe splitting cutter 200 relative to the pneumatic hammer 102 enables the pneumatic hammer 102 to transmit percussive forces into the cutter at that angle. The cutter 200 at the same time guides the pneumatic hammer 102 through the non-linear portions of the pipe.

Several options for the method 1900 follow. In one example, splitting the non-linear portion of the pipe includes transmitting percussive forces to an expander interposed between the rotatable joint 206 and the pneumatic hammer 102. In another example, splitting the non-linear portion of the pipe includes transmitting pulling forces from a cable coupling (e.g., the expander 212, cable gripping housing 228 and cable gripping anchor 230) through the rotatable joint 206 to the pipe splitting cutter 200 while the pipe splitting cutter is at any angle to the cable coupling fixed to the cable. In still another example, the method 1900 includes isolating the rotatable joint 206 during articulation of the pipe splitting cutter 200 with a joint skirt, such as joint skirt 1522 shown in FIG. 15D. Optionally, the method 1900 further includes driving an anchor jack 1530 into engagement with a cable gripping anchor 1526 to disengage the cable gripping anchor from around a cable. For instance, driving the anchor jack includes tapping the anchor jack toward the cable gripping anchor 1526 with a tool including a projection extending into the cable lumen of the expander 1504.

Figure 20:
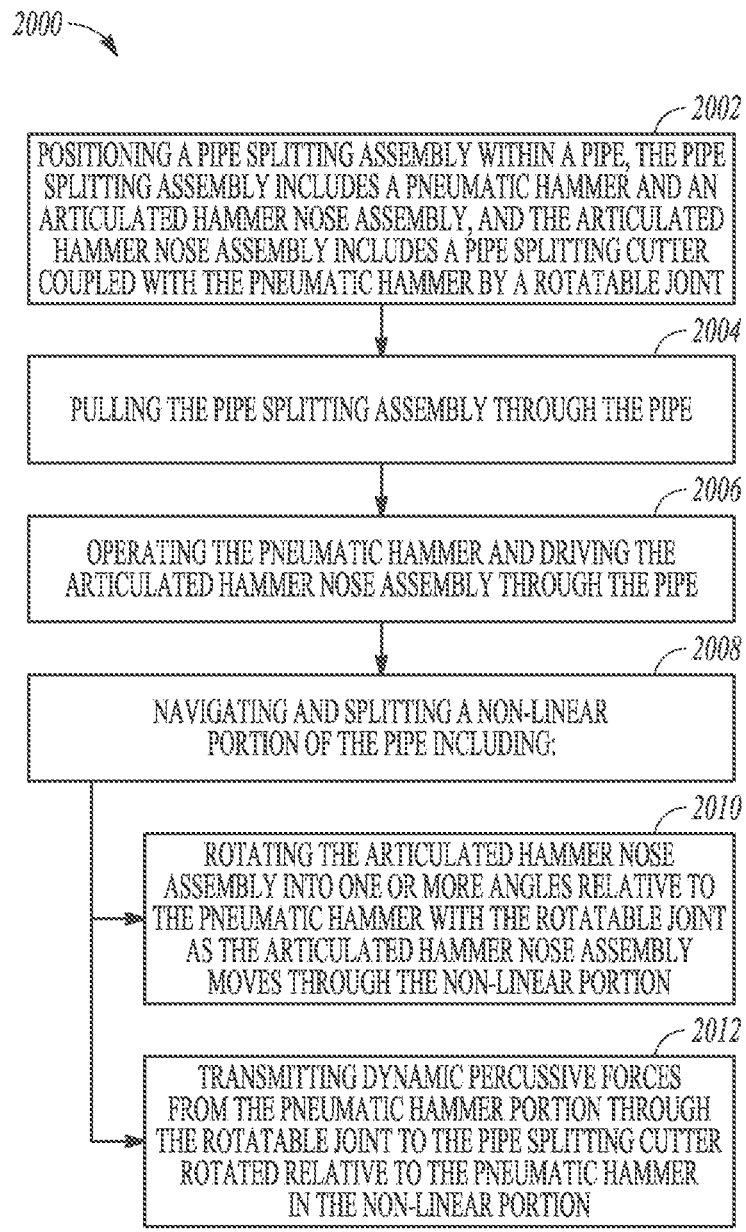
FIG. 20 is a block diagram showing another example of a method for using a pipe splitting assembly.

Another method 2000 for using a pipe splitting assembly 100 is shown in FIG. 20. References are made to one or more elements described above. The references are not intended to be exclusive. For instance, the elements include other similar elements described herein as well there equivalents. At 2002, a pipe splitting assembly 100 is positioned within the existing pipe. The pipe splitting assembly 100 includes a pneumatic hammer 102 and an articulated hammer nose assembly 104. The articulated hammer nose assembly 104 includes a pipe splitting cutter 200 coupled with the pneumatic hammer 102 through a rotatable joint 206. Optionally, the rotatable joint 206 includes a ball and socket joint having correspondingly shaped fittings and sockets to maintain surface to surface contact between the pipe splitting cutter and the pneumatic hammer throughout articulation of the hammer nose assembly 104.

At 2004, the pipe splitting assembly 100 is pulled through the existing pipe. For example, referring to FIG. 2B, pulling forces are transmitted from a cable gripping anchor 230 through a cable gripping housing 228 coupled with the expander 212. Pulling forces are then transmitted through the rotatable joint 206 into the cutter 200. At 2006, the pneumatic hammer 102 is operated and drives the articulated hammer nose assembly 104 through the existing pipe.

At 2008, the method 2000 includes navigating and splitting a non-linear portion of the existing pipe. As shown at 2010, navigating and splitting the non-linear portion of the existing pipe includes rotating the articulated hammer nose assembly 104 into one or more angles relative to the pneumatic hammer 102 with the rotatable joint 206. The hammer nose assembly 104 is articulated relative to the pneumatic hammer 102 as the assembly moves through the non-linear portion of the existing pipe. At 2012, navigating and splitting the non-linear portion of the existing pipe further includes transmitting dynamic percussive forces from the pneumatic hammer 102 through the rotatable joint 206 to the pipe splitting cutter 200 while the pipe splitting cutter 200 is rotated relative to the pneumatic hammer 102 and within the non-linear portion of the existing pipe.

As previously described, the dynamic percussive forces are transmitted into the hammer nose assembly 104 including the cutter 200 by way of surface to surface contact between fittings and sockets at the rotatable joint 206. These surfaces are in continuous surface to surface contact as the cutter 200 articulates relative to the pneumatic hammer 102 thereby ensuring continuous transmission of the percussive forces across the planar surface as opposed to point and edge contacts that are subject to deformation and failure over time. In one option, navigating and splitting the non-linear portion of the existing pipe includes guiding of the pneumatic hammer 102 toward and through the non-linear portion with the hammer nose assembly 104 including the pipe splitting cutter 200. Stated another way, while the pneumatic hammer 102 is driving the cutter 200 forward through the non-linear portion of the existing pipe the hammer nose assembly 104 guides the pneumatic hammer 104 into that non-linear portion of the existing pipe. Guidance of the pneumatic hammer 102 substantially prevents wandering of the pneumatic hammer 102 away from the existing pipe and minimizes lodging of the pneumatic hammer within the soil and rock surrounding the existing pipe.

Several options for the method 2000 follow. In one example, rotating the articulating hammer nose assembly 104 into one or more angles relative to the pneumatic hammer 102 includes rotating fittings 220, 224 relative to sockets 222, 226 and the fittings and sockets are in surface to surface contact throughout rotation of the articulated hammer nose assembly 104. In another example, rotating the articulated to hammer nose assembly 104 into one or more angles includes rotating the pipe splitting cutter 200 into one or more angles relative to the pneumatic hammer 102 with the rotatable joint 206 including a plurality of joints. In still another example, navigating and splitting the non-linear portion of the pipe includes transmitting percussive forces to an expander 212 interposed between the rotatable joint 206 and the pneumatic hammer 102.

The method 2000 further includes, in one example, transmitting pulling forces from a cable coupling (e.g., cable gripping anchor 230, cable gripping housing 228 and expander 212) through the rotatable joint 206 to the pipe splitting cutter 200 while the pipe splitting coupler is at an angle to the cable coupling. In yet another example, rotating the articulated hammer nose assembly 104 into one or more angles includes maintaining a portion of a load bearing surface of the pipe splitting cutter 200 at the rotatable joint 206 perpendicular to a longitudinal axis of the pneumatic hammer 102. The portion of the cutter load bearing surface is in constant surface to surface contact at the rotatable joint 206 throughout rotation of the hammer nose assembly 104. For instance, the cutter joint surface 302 and second barjoint surface 408 are maintained in constant surface to surface contact with the opposing surfaces of the joint nut 210 and cutter 200. The cutter joint surface 302 and the first bar joint surface 406 provide surfaces that are substantially perpendicular to the longitudinal axis of the pneumatic hammer 102 throughout rotation of the hammer nose assembly 104 relative to the pneumatic hammer. The perpendicular surfaces transmit the percussive driving forces into the hammer nose assembly 104 to the cutter 200 without point or edge contacts.

CONCLUSION

The hammer nose assemblies described herein provide a single assembly that uses both pulling forces and dynamic percussive forces to split piping and tubing having non-linear portions. Non-linear portions include, for instance, tubing and piping unwound from a roll or spool and buried with inherent non-linear lengths formed by the shape of the roll or spool. The hammer nose assembly receives percussive forces from the pneumatic hammer while articulated within non-linear piping and tubing relative to the hammer. Stated another way, the hammer nose assembly transmits pulling and percussive forces to the pipe splitting cutter in a non-linear portion of a pipe while the pipe splitting cutter is at an angle relative to the pneumatic hammer. The hammer nose assembly also navigates the pneumatic hammer through the piping and tubing, including non-linear portions, and navigates the hammer away from surrounding rock and soil to prevent lodging of the hammer and interruption of the splitting operation. The hammer nose assembly thereby consolidates the guide function with transmission of percussive forces to an articulated cutter. Guiding of the pneumatic hammer through non-linear portions of piping and tubing is an unexpected result of the articulated hammer nose assembly that minimizes splitting operation interruptions and conversely enhances the reliability of the hammer nose assembly.

The rotatable joint of the hammer nose assembly maintains surface to surface contact between components of the hammer nose assembly. The surface to surface contact avoids edge and point contacts that may fail under cyclical loading from the hammer and pulling forces from the cable. A perpendicular load bearing surface is maintained at the joint relative to the longitudinal axis of the expander. The perpendicular surface receives the pulling and percussive forces and substantially prevents slipping and deflection of the joint fittings and sockets. Moreover, the perpendicular surface to surface contact ensures the entirety of the pulling and percussive forces are transmitted to the cutter without deflection or slipping due to surfaces meeting at an angle relative to the hammer and expander longitudinal axes.

Although the present invention has been described in reference to preferred embodiments, persons skilled in the art will recognize that changes may be made in form and detail without departing from the spirit and scope of the invention. It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present application. The scope of the invention should, therefore, be determined with reference to the appended claims, along with the full scope of equivalents to which such claims are entitled.

What is claimed is:

1. A pipe splitting assembly comprising:
    an expander;
    a number of cable gripping anchors coupled to the expander, wherein the number of cable gripping anchors are configured to slide against a tapered surface to clamp around a cable, such that the number of cable gripping anchors include a leading portion and a trailing portion, and the number of cable gripping anchors tighten against the cable when sliding against the tapered surface towards the leading portion;
    a leading cutter body in front of the expander, wherein a back end of the leading cutter body faces towards a back end of the pipe splitting assembly; and
    a joint bar interposed between the leading cutter body and the expander, wherein the joint bar forms a part of two ball and socket joints in the pipe splitting assembly, wherein the joint bar includes a central passage sized for the cable to pass through from the leading cutter to the expander.

2. The pipe splitting assembly of claim 1, wherein the leading cutter body is configured to abut a front portion of the joint bar, but is not fastened to the joint bar.

3. The pipe splitting assembly of claim 1, wherein the leading cutter body includes one or more removable blades.

4. The pipe splitting assembly of claim 3, wherein the removable blades are accessible from a backside of the removable blades through a passage.

5. The pipe splitting assembly of claim 1, further including a pneumatic hammer coupled behind the expander.

6. A pipe splitting assembly comprising:
    an expander;
    a number of cable gripping anchors coupled to the expander, wherein the number of cable gripping anchors are configured to slide against a tapered surface to clamp around a cable, such that the number of cable gripping anchors include a leading portion and a trailing portion, and the number of cable gripping anchors tighten against the cable when sliding against the tapered surface towards the leading portion; and
    a leading cutter body in front of the expander, wherein the leading cutter body forms a rotatable joint in front of the expander, wherein a leading cutter body portion of the rotatable joint is concave and faces towards a back end of the pipe splitting assembly to reduce debris as the pipe splitting assembly moves forward;
    wherein the rotatable joint is a ball and socket joint and wherein the leading cutter body is configured to abut a front portion of the pipe splitting assembly, but is not fastened to the pipe splitting assembly.

7. The pipe splitting assembly of claim 6, wherein the leading cutter body includes one or more removable blades.

8. The pipe splitting assembly of claim 7, wherein the removable blades are accessible from a backside of the removable blades through a passage.

9. The pipe splitting assembly of claim 6, further including a pneumatic hammer coupled behind the expander.

* * * * *